(12) United States Patent
Yamaguchi

(10) Patent No.: US 8,504,944 B2
(45) Date of Patent: Aug. 6, 2013

(54) IMAGE PROCESSING APPARATUS, METHOD OF DISPLAYING IMAGE, IMAGE DISPLAY PROGRAM, AND RECORDING MEDIUM HAVING IMAGE DISPLAY PROGRAM FOR DISPLAYING IMAGE RECORDED THEREON

(75) Inventor: Tadashi Yamaguchi, Saitama (JP)

(73) Assignee: Sony Corporation, Tokyo (JP)

( * ) Notice: Subject to any disclaimer, the term of this patent is extended or adjusted under 35 U.S.C. 154(b) by 252 days.

(21) Appl. No.: 13/053,510

(22) Filed: Mar. 22, 2011

(65) Prior Publication Data

US 2011/0246948 A1 Oct. 6, 2011

(30) Foreign Application Priority Data

Mar. 30, 2010 (JP) .................................. 2010-079696

(51) Int. Cl.
*G06F 3/048* (2006.01)

(52) U.S. Cl.
USPC ........... 715/846; 715/835; 715/838; 715/860; 345/178

(58) Field of Classification Search
USPC .................. 345/178, 173; 715/702, 846, 835, 715/863, 860, 838
See application file for complete search history.

(56) References Cited

U.S. PATENT DOCUMENTS

| | | | |
|---|---|---|---|
| 6,100,877 A * | 8/2000 | Chery et al. .................. | 345/178 |
| 6,104,387 A * | 8/2000 | Chery et al. .................. | 345/179 |
| 6,211,863 B1 * | 4/2001 | Chery et al. .................. | 345/179 |
| 6,323,846 B1 * | 11/2001 | Westerman et al. .......... | 345/173 |
| 7,081,886 B2 * | 7/2006 | Nakano et al. ................ | 345/173 |
| 7,256,772 B2 * | 8/2007 | Morrison ....................... | 345/178 |
| 7,293,246 B2 * | 11/2007 | Baudisch et al. ............. | 715/858 |
| 7,492,357 B2 * | 2/2009 | Morrison et al. ............. | 345/173 |
| 7,646,380 B2 * | 1/2010 | Tsang ............................ | 345/178 |
| 7,714,849 B2 * | 5/2010 | Pryor ............................. | 345/173 |
| 7,810,050 B2 * | 10/2010 | Hirai et al. .................... | 715/863 |
| 8,164,582 B2 * | 4/2012 | North et al. ................... | 345/178 |
| 2004/0041842 A1 * | 3/2004 | Lippincott .................... | 345/783 |
| 2006/0007170 A1 * | 1/2006 | Wilson et al. ................. | 345/173 |
| 2008/0163131 A1 * | 7/2008 | Hirai et al. .................... | 715/863 |
| 2010/0079412 A1 * | 4/2010 | Chiang et al. ................. | 345/175 |
| 2010/0085303 A1 * | 4/2010 | Kwok et al. ................... | 345/157 |
| 2011/0181523 A1 * | 7/2011 | Grothe et al. ................. | 345/173 |

FOREIGN PATENT DOCUMENTS

| | | |
|---|---|---|
| JP | 2004-054413 A | 2/2004 |
| JP | 2009-043228 A | 2/2009 |

\* cited by examiner

*Primary Examiner* — Daeho Song
(74) *Attorney, Agent, or Firm* — Wolf, Greenfield & Sacks, P.C.

(57) ABSTRACT

An image processing apparatus includes: an image display control unit controlling an image display on a display screen; an image generating unit generating a question image including a question and option buttons configured by icons that can be arbitrarily selected for the question; a position detecting unit detecting a position of a pointer present on the display screen from imaging data acquired by imaging the display screen; a position information storing unit storing positions of the icons when the question image is displayed on the display screen; and a control unit specifying an icon out of the icons selected by the pointer based on the position of the pointer and calibrating the position of the pointer based on the position of the icon, which is stored in the position information storing unit, corresponding to the icon specified to have been selected.

9 Claims, 21 Drawing Sheets

FIG.3
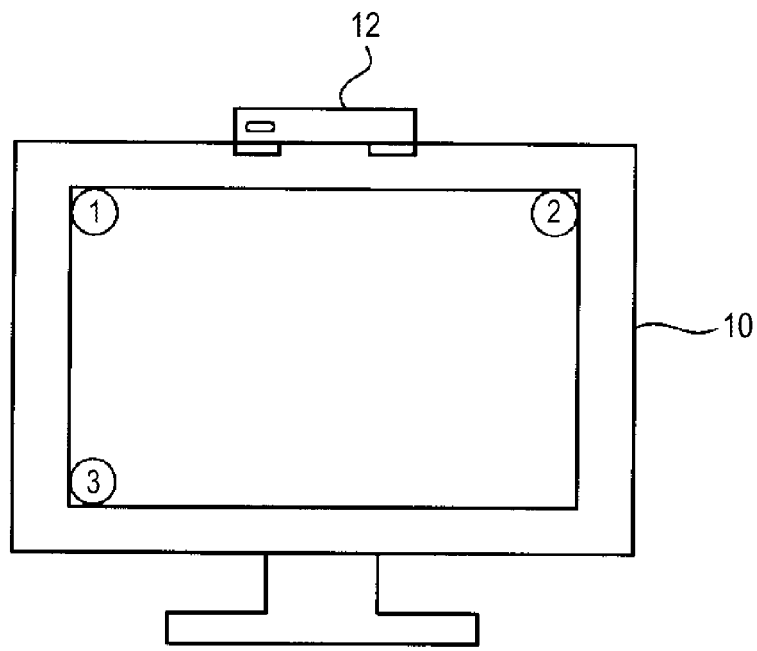
FIG.4A
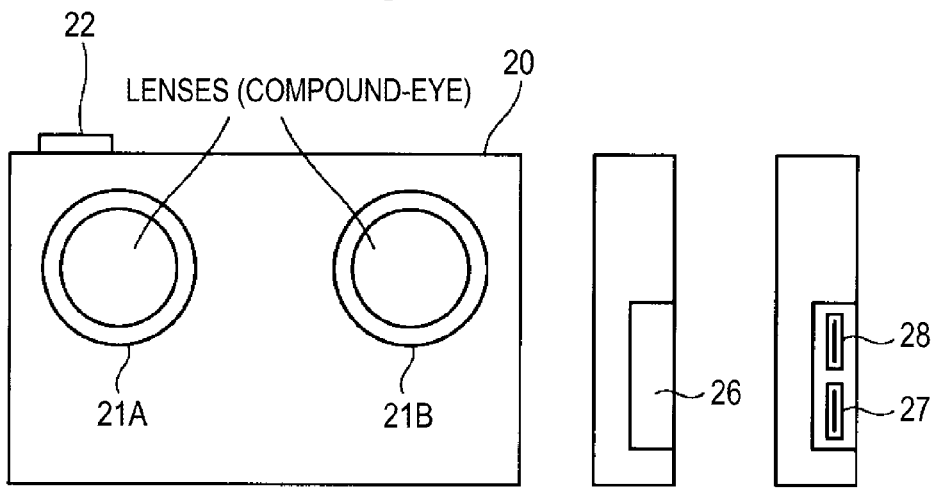
FIG.4B
FIG.4D  FIG.4E
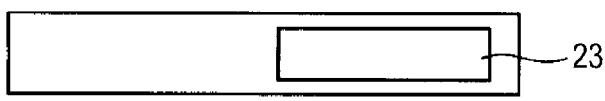
FIG.4C
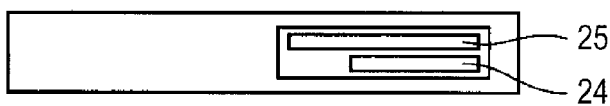

IMAGE PROCESSING APPARATUS, METHOD OF DISPLAYING IMAGE, IMAGE DISPLAY PROGRAM, AND RECORDING MEDIUM HAVING IMAGE DISPLAY PROGRAM FOR DISPLAYING IMAGE RECORDED THEREON

BACKGROUND OF THE INVENTION

1. Field of the Invention

The present invention relates to an image processing apparatus, a method of displaying an image, an image display program, and a recording medium having the image display program recorded thereon, and more particularly, to a calibration process in an optical touch panel, for example, using a twin-lens camera-attached reproduction apparatus.

2. Description of the Related Art

Many techniques are proposed for realizing a so-called touch UI (User Interface) by calculating the position (touch position) pointed by a finger, a pen, or the like on a screen using a plurality of cameras or the like. Such a touch UI is known as an optical touch panel and is applied to an electronic blackboard, a display device connected to a personal computer, and the like.

FIG. 1 is a diagram illustrating an example of an optical touch panel that realizes a touch UI. Generally, an optical touch panel is configured by an external output device 1 and two cameras 2 and 3 that are mounted on the left and right sides of the upper portion thereof. When a distance L between lenses of the two cameras 2 and 3 and angles α and β from each camera to a touch position are known, distances L1 and L2 between the cameras 2 and 3 and the touch position on the screen are acquired, thereby the touch position can be calculated. In addition, the external output device 1 may have a display function. Examples of the external output device 1 include a television set, a display device, and the like.

Actually, it is difficult to precisely measure the distance between a camera and a touch position on the screen by using only the cameras. Thus, as illustrated in FIG. 1, infrared-ray transmitting function is implemented in the cameras 2 and 3, and a frame 1a that is used for reflecting the infrared rays is arranged on both side portions and the lower portion of the external output device 1. There are many optical touch panels that employ a form in which infrared rays are emitted from the cameras 2 and 3, and the position of a portion is calculated for which the emitted infrared rays are blocked by a finger 4 or the like and are not returned from the frame 1a. In a case where the precision is demanded in units of the tip end of a pointer of an electronic blackboard or the like or a finger, the precision of position detection is increased by using infrared rays or the like. However, in a case where an object such as a hand or the like having a relatively large size may be approximately perceived, only cameras may be used even in the current technology.

In optical touch panels that are applied to a general electronic blackboard, a display device connected to a personal computer, or the like, cameras are fixed to the external output device. Thus, such optical touch panels are shipped after being adjusted in a factory or the like such that an actual touch position on the screen and a detected touch position coincide with each other. However, in a case where position checking sensors such as cameras are removable, error in the detected position of the touch position occurs in the optical touch panels due to mounting positions when the sensors are not correctly mounted in the external output device. Accordingly, in order to perform analysis of the relative position between the sensor and the screen, a calibration process is necessary.

FIGS. 2A to 2C are diagrams illustrating cases where error in the detected position occurs in an optical touch panel using a twin-lens camera. As illustrated in FIG. 2A, in a case where the twin-lens camera 12 is mounted at the center of the upper portion of the frame 11 arranged on the periphery of the screen of the external output device 10, a touch position A is detected based on angles α and β formed from each lens of the twin-lens camera 12 toward the touch position A. On the other hand, as illustrated in FIG. 2B, in a case where the twin-lens camera 12 is mounted at a position deviated to the right side from the center of the upper portion of the frame 11 arranged on the periphery of the screen of the external output device 10, the touch position A is detected based on angles α' and β' formed from each lens of the twin-lens camera 12 toward the touch position A on the screen.

Accordingly, in a case where the deviation of the twin-lens camera 12 from the center of the upper portion of the frame 11 of the external output device 10 is not known, a touch position is calculated on a premise that the twin-lens camera 12 is mounted at the center thereof. In other words, as illustrated in FIG. 2C, not the touch position A but a touch position A' is incorrectly recognized to have been pointed. In order to resolve this, a calibration operation is necessary for a camera that is removable from the external output device when the camera is mounted in the external output device.

Several calibration methods are proposed. Generally, in order to perform a calibration process, it is necessary for the positions of several points on the screen to be correctly recognized. As an example, there is a calibration method using an information input auxiliary sheet in which calibration marks are formed in two or more corner portions and the center portion (for example, see JP-A-2009-043228).

As an advanced type thereof, in order to allow a plurality of the positions of points on the screen to be correctly recognized, a calibration method is proposed in which a confirm button (icon) is displayed at a position desired to be pressed on the screen (for example, see JP-A-2004-054413).

FIG. 3 is a diagram illustrating a general calibration method. As points for calibration, at least three points are displayed on the corners of the screen of the external output device 10 and are sequentially touched by a user. Then, a correction value used for correcting the positional relationship between a touch position and the twin-lens camera 12 (sensor) is calculated and is added to a value acquired through triangulation, thereby the error in the detected position is corrected. Furthermore, by increasing the number of points, error can be corrected with higher precision.

SUMMARY OF THE INVENTION

However, the technology disclosed in JP-A-2004-054413 is basically the same as the general calibration method disclosed in JP-A-2009-043228 from the viewpoint that determined points (input points R1, S1, T1, and U1 represented in FIG. 12 of JP-A-2004-054413) on the screen are touched. Although there is an advantage that a user does not necessarily remember to perform a calibration operation, there is a large burden of pressing predetermined positions.

Thus, it is desirable to lessening the work burden of a user by performing a calibration operation, which is annoying to a user, in a more natural way without being recognized by the user.

According to an embodiment of the present invention, a question image including a question and option buttons configured by a plurality of icons that can be arbitrarily selected for the question is generated by using an image generating unit included in an image processing apparatus. Next, a position of a pointer that is present on the display screen is detected from imaging data acquired by imaging the display screen on which an image display is controlled by an image display control unit by a position detecting unit. Then, an icon out of the plurality of icons that is selected by the pointer is specified based on the position of the pointer that is detected by the position detecting unit by a control unit. Next, the position of the pointer, which corresponds to the icon specified to have been selected, detected by the position detecting unit is calibrated based on the position of icon when the question image, which is stored in a position information storing unit, generated by the image generating unit is displayed on the display screen.

In the above-described configuration according to the embodiment of the present invention, a question and a plurality of option buttons are displayed on the display screen so as to allow a user to select an option button, and calibration is performed on the background in parallel with the user's operation. Therefore, calibration is performed in a more natural way without being recognized by the user.

According to the embodiment of the present invention, the work burden of a user is lessened by performing a calibration operation, which is annoying to a user, in a more natural way without being recognized by the user.

BRIEF DESCRIPTION OF THE DRAWINGS

FIG. 3 is a diagram illustrating a general calibration method.

FIGS. 4A to 4E are external views of a twin-lens camera-attached reproduction apparatus according to an embodiment of the present invention.

DESCRIPTION OF THE PREFERRED EMBODIMENTS

Figure 1:
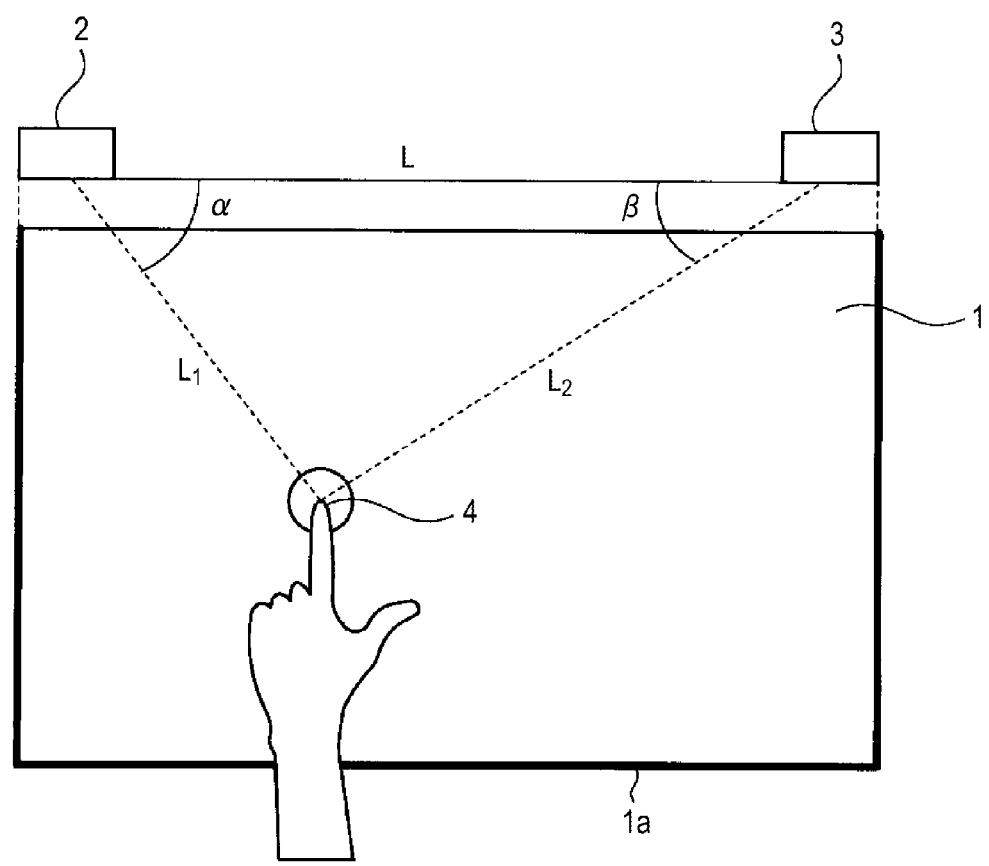
FIG. 1 is a diagram illustrating an example of a general optical touch panel.
Figure 2A:
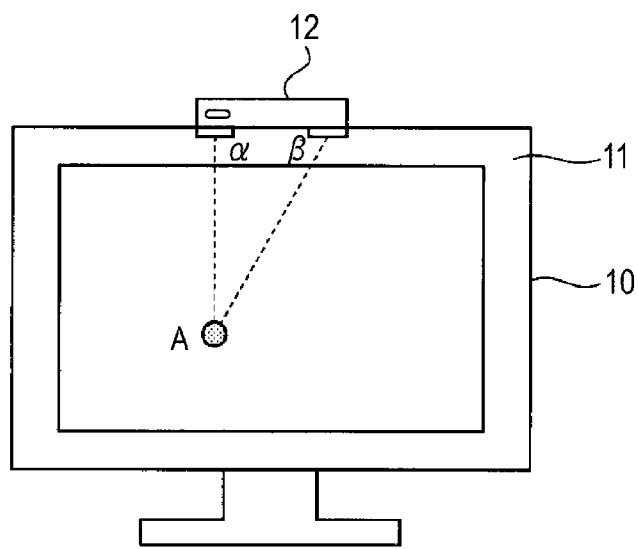
FIGS. 2A to 2C are diagrams illustrating cases where error in a detected position occurs in an optical touch panel using a twin-lens camera-attached reproduction apparatus.
Figure 2B:
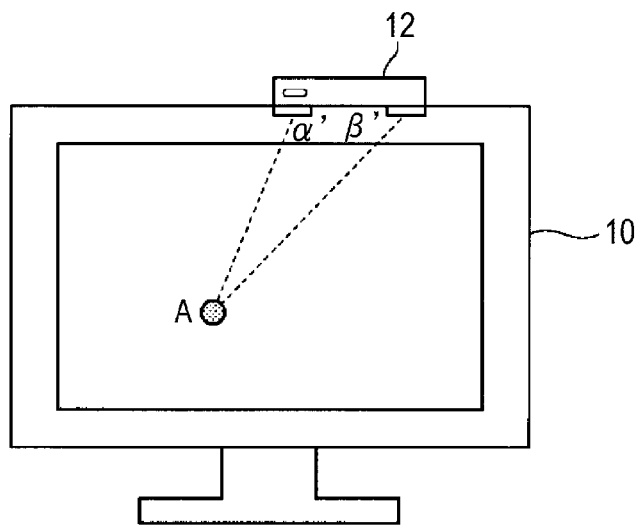
Figure 2C:
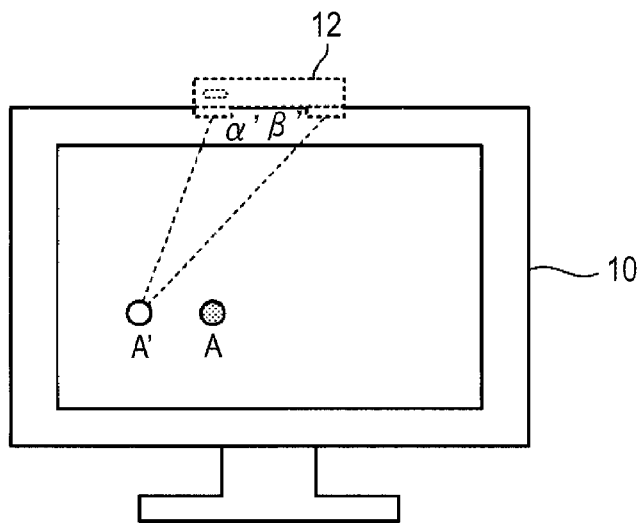

Hereinafter, exemplary embodiments of the present invention will be described with reference to the accompanying drawings. The description will be made in the order of the following items.

1. Embodiment (Example in which Question and Option Buttons are Displayed)

2. Others (Example in which Option Buttons are Displayed in Enlarged Scale in Accordance with Screen Size)

<1. Embodiment>

[Appearance of Twin-Lens Camera-Attached Reproduction Apparatus]

An example will be described in which an image processing apparatus according to an embodiment of the present invention used for an optical touch panel is applied to a reproduction apparatus having a camera in which a plurality of lenses are mounted. FIGS. 4A to 4E are external views of a twin-lens camera-attached reproduction apparatus according to an embodiment of the present invention. FIG. 4A is a front view. FIGS. 4B and 4C are bottom views with the lid on and off. FIGS. 4D and 4E are side views with the lid on and off.

A twin-lens camera-attached reproduction apparatus (hereinafter, briefly referred to as a "reproduction apparatus") 20 is an example of an image processing apparatus and includes twin-lens lenses 21A and 21B and a shutter button 22. As a user presses the shutter button 22, the reproduction apparatus 20 can photograph and record a two-dimensional video (a still image or a moving image) by using input of an optical image from one lens. In addition, the reproduction apparatus 20 can photograph and record a three-dimensional video (a still image or a moving image) by using input of optical images from the twin-lens lenses 21A and 21B. Hereinafter, a still image and a moving image that correspond to optical images received by the lenses are collectively referred to as a "video", and data of a video is referred to as "video data".

In this embodiment, a photographed video is recorded in a memory card 24, shown in FIG. 4C, that is located at a place where a bottom lid 23 shown in FIG. 4B is open. As illustrated in FIG. 4C, the reproduction apparatus 20 includes a battery 25 and can be also used outdoors or the like. In addition, by connecting an AC power source to a power supply terminal 27, which is located at a place where a side lid 26 illustrated in FIG. 4D is open, shown in FIG. 4E so as to supply power thereto, the reproduction apparatus 20 can be operated without inserting the battery 25 therein, or the battery 25 can be charged. In addition, by connecting a cable to an external output terminal 28 shown in FIG. 4E, the reproduction apparatus 20 can be connected to an external output device such as a television set or the like. Here, the appearance of the key arrangement, input/output terminals, and the like of the reproduction apparatus 20 is merely an example, and the embodiment is not limited thereto.

[Appearance of Optical Touch Panel to which Reproduction Apparatus is Installed]

Figure 5:
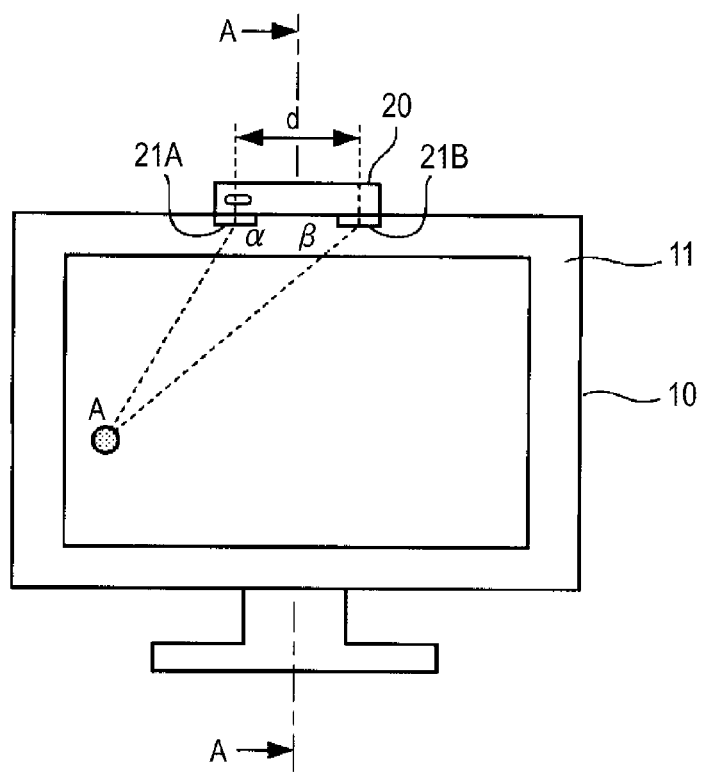
FIG. 5 is a front view of an optical touch panel using a twin-lens camera-attached reproduction apparatus according to an embodiment of the present invention.

FIG. 5 is a front view of an optical touch panel using the reproduction apparatus 20. As illustrated in FIG. 5, the reproduction apparatus 20 is installed to the upper side of a frame 11 of an external output device 10 in a state in which the lenses 21A and 21B of the reproduction apparatus 20 are placed on the lower side. Accordingly, as illustrated in FIG. 5, by acquiring the position of a pointer such as a hand, a finger, or a pen through three-point measurement by using videos acquired by using two lenses 21A and 21B, a touch UI can be realized. As described above, when a distance d between the lenses 21A and 21B and angles α and β toward a touch position A are known, generally, the touch position can be calculated.

The external output device 10 may have a display function, and a display apparatus such as a television set or a liquid crystal display panel can be used.

Figure 6:
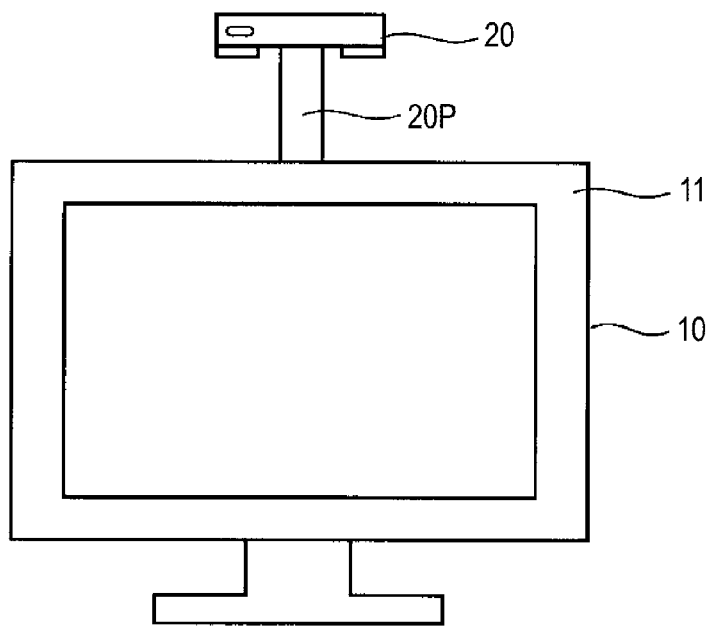
FIG. 6 is a front view of a first modified example of a twin-lens camera-attached reproduction apparatus according to an embodiment of the present invention.

FIG. 6 is a front view of a first modified example of a twin-lens camera-attached reproduction apparatus according to an embodiment of the present invention. When the reproduction apparatus 20 is installed, it is necessary for both eyes (the lenses 21A and 21B) of the twin-lens camera to be able to detect four corners of the screen of the external output device 10. When four corners of a large screen of the external output device 10 is not fitted therein, a wide-angle lens is used. Alternatively, as illustrated in FIG. 6, a fixture (a cradle or the like) 20P that allows the reproduction apparatus 20 to be installed at a position separated from the upper portion of the frame 11 of the external output device 10 may be attached to the upper portion of the frame 11.

Figure 7:
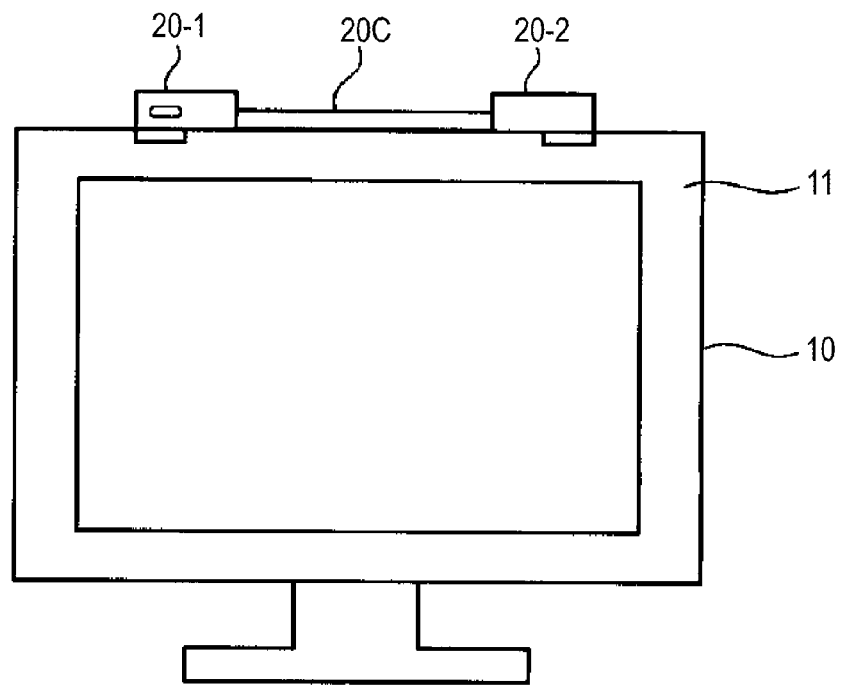
FIG. 7 is a front view of a second modified example of a twin-lens camera-attached reproduction apparatus according to an embodiment of the present invention.

FIG. 7 is a front view of a second modified example of a twin-lens camera-attached reproduction apparatus according to an embodiment of the present invention. Differently from the example illustrated in FIG. 6, as illustrated in FIG. 7, it may be configured such that the reproduction apparatus 20 is divided at the center into reproduction apparatuses 20-1 and 20-2, and the reproduction apparatuses 20-1 and 20-2 are connected to each other through a cable 20C.

Figure 8:
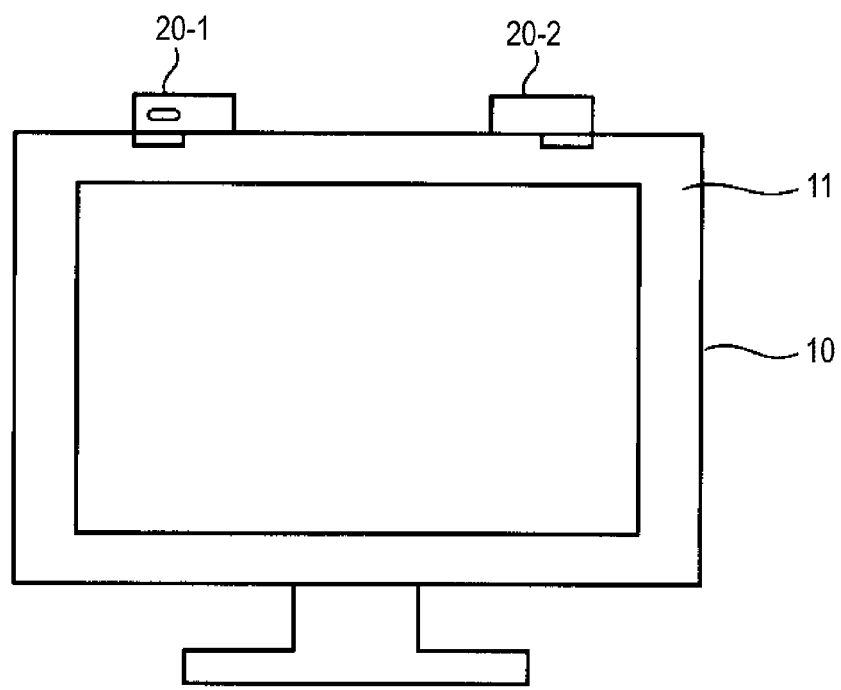
FIG. 8 is a front view of a third modified example of a twin-lens camera-attached reproduction apparatus according to an embodiment of the present invention.
Figure 9:
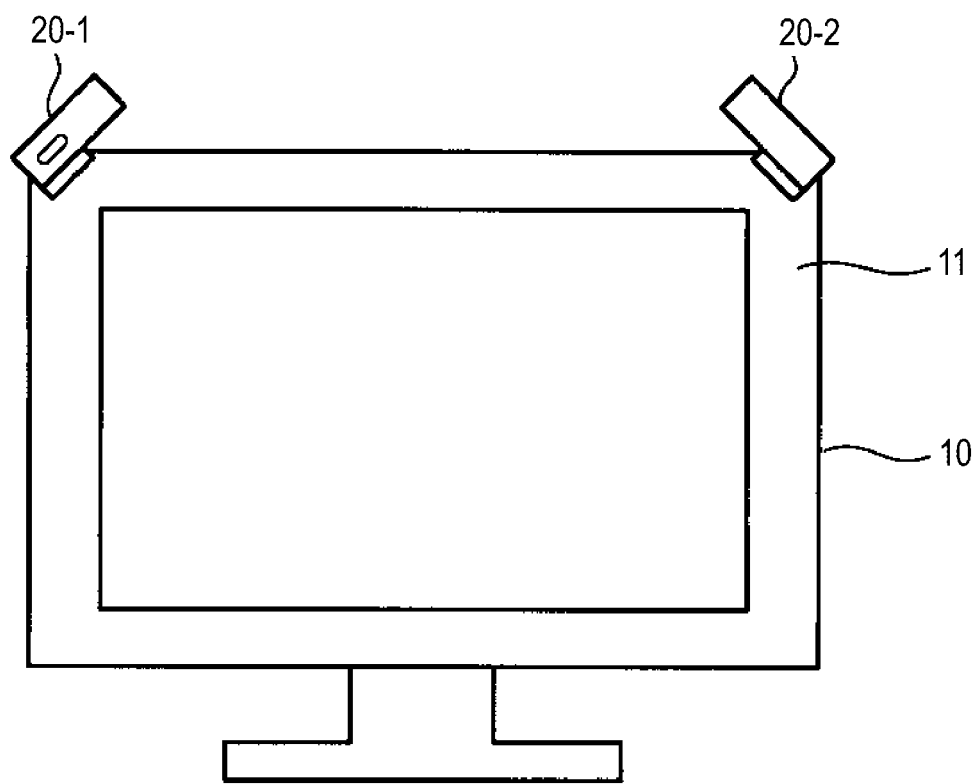
FIG. 9 is a front view of a fourth modified example of a twin-lens camera-attached reproduction apparatus according to an embodiment of the present invention.

FIG. 8 is a front view of a third modified example of a twin-lens camera-attached reproduction apparatus according to an embodiment of the present invention. As illustrated in FIG. 8, the reproduction apparatuses 20-1 and 20-2 may be installed in a form in which information is exchanged in a wireless manner. FIG. 9 is a front view of a fourth modified example of a twin-lens camera-attached reproduction apparatus according to an embodiment of the present invention. In addition, the two lenses may not be disposed completely downwardly and may be arranged near the corners of the frame 11 in an oblique direction as represented in FIG. 9, as long as four corners of the screen of the external output device 10 can be captured.

[Touch UI Realized by Using External Output Device having Large Screen]

Next, a touch UI that is realized by the external output device 10 will be described. FIGS. 10A to 10D are diagrams illustrating an example of the Touch UI of the external output device 10. In the example shown in FIGS. 10A to 10D, the description will be presented on the premise that the reproduction apparatus 20 is installed on the external output device 10 in the form illustrated in FIG. 5 and can detect four corners of the screen.

Figure 10A:
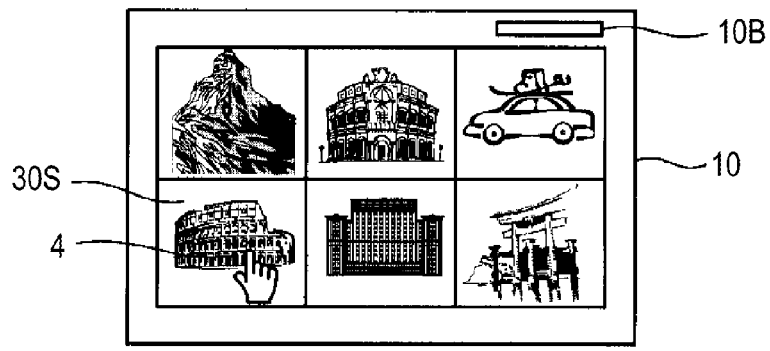
FIGS. 10A to 10D are diagrams illustrating an example of the Touch UI of a large-sized external output device.

In the optical touch panel using the reproduction apparatus 20 according to this embodiment, as a user presses a mode switching button 10B of the external output device 10, which is shown in FIG. 10A, switching to a reproduction mode from another mode such as a recording mode can be performed.

Figure 10B:
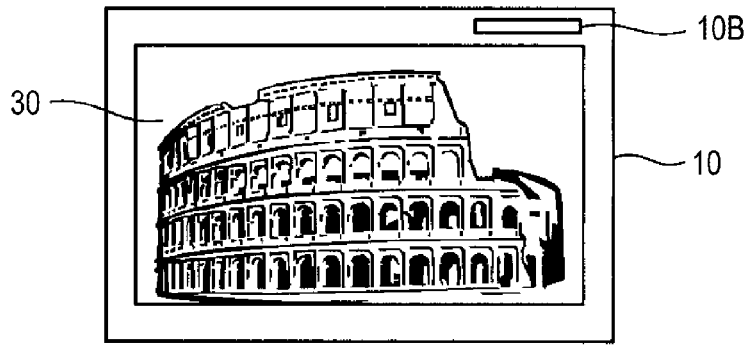
Figure 10C:
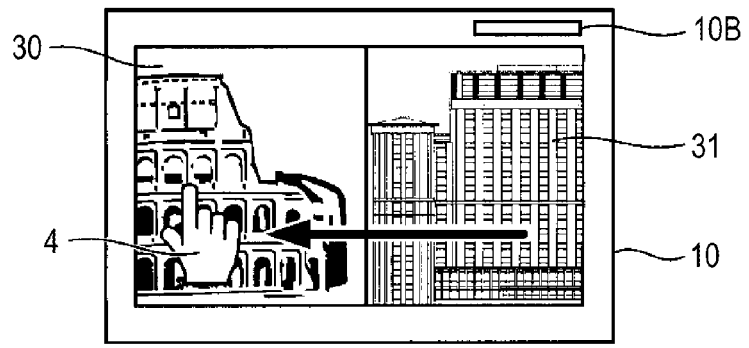
Figure 10D:
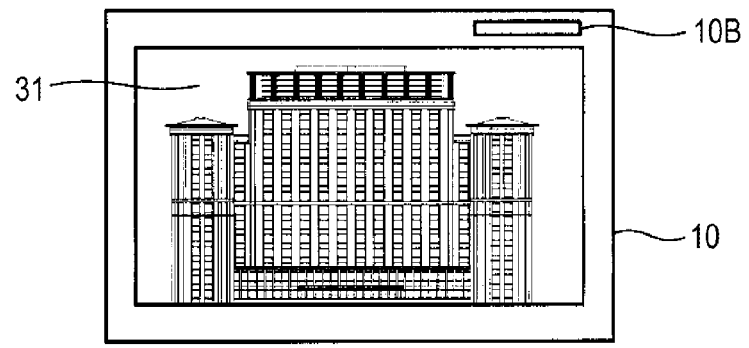

In a case where the reproduction apparatus 20 has a photograph function, the external output device 10 can reproduce video data that is recorded using the photograph function or video data that is photographed by another photographing device or the like. When the external output device 10 is switched to the reproduction mode by pressing the mode switching button 10B, a list of video data recorded in the memory card 24 is displayed on the screen. In the example illustrated in FIG. 10A, six thumbnail images are displayed on the screen. Here, when reproduction is desired to be performed, a thumbnail image corresponding to the video desired to be reproduced is touched with the finger 4, whereby a desired video is selected. Here, a thumbnail image 30S is selected, and a selected image 30 corresponding thereto is displayed and reproduced on the entire screen as illustrated in FIG. 10B. Here, for example, as illustrated in FIG. 10C, when the finger 4 is slid to the left side on the optical touch panel, the selected image 30 moves to the left side in accordance of the movement of the finger 4, and, as illustrated in FIG. 10D, the display can be switched to an image 31 recorded next thereto.

In a mobile telephone such as a smart phone, a digital still camera, a digital video camera, and the like, a touch operation that can be intuitively performed has become mainstream. Meanwhile such a trend is spreading to external output devices such as display apparatuses connected to a television set or a personal computer, and, recently, a touch UI function has been mounted in OS (Operating Systems) that have recently become commercially available as a standard. Accordingly, in an external output device such as a display apparatus that is connected to a television set or a personal computer, intuitive operations that can be performed only on a large screen can be performed.

Figure 11A:
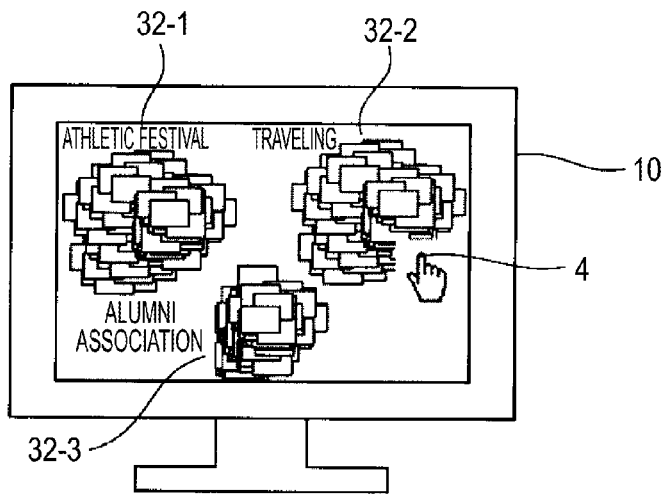
FIGS. 11A to 11C are diagrams (1) illustrating another example of the touch UI of a large-sized external output device.
Figure 11B:
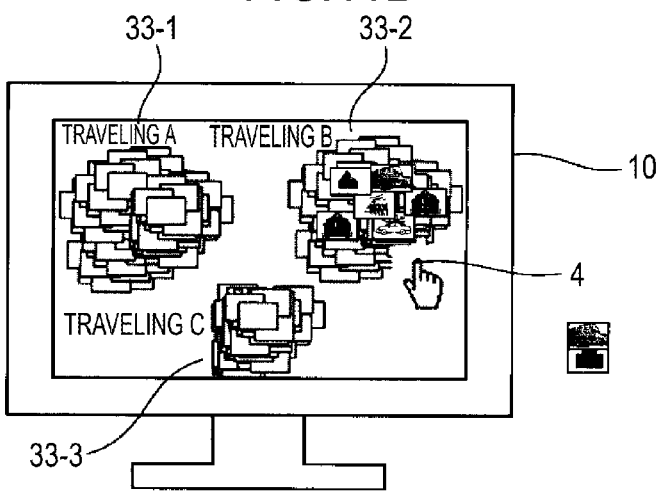
Figure 11C:
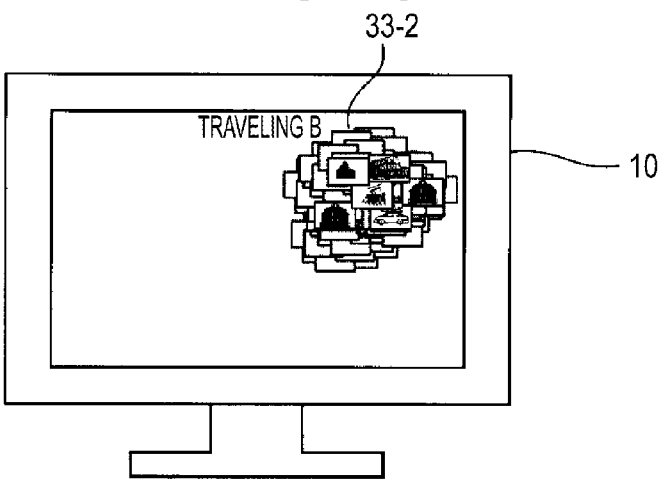

FIGS. 11A to 11C are diagrams (1) illustrating another example of the touch UI of the external output device 10. Here, a case where the reproduction apparatus 20 is connected to the external output device 10 having a large screen or a case where a memory card in which video data is recorded is inserted into a memory card reader mounted in the external output device 10 will be assumed. As illustrated in FIG. 11A, in the external output device 10, thumbnail images of recorded video data are divided into categories so as to form a display that looks like thumbnail images scattered on a desk. In the example illustrated in FIG. 11A, thumbnail image groups 32-1 to 32-3 belonging to an athletic festival category, a travelling category, and an alumni association category are displayed.

For example, when a portion corresponding to a mountain of the traveling category on the screen is selected by being touched with the finger 4, as illustrated in FIG. 11B, photographs relating to traveling are displayed with classification into periods, places, and the like of traveling. In this example, thumbnail image groups 33-1 to 33-3 of three categories including Traveling A, Traveling B, and Traveling C are displayed. At this time, when a portion corresponding to the thumbnail group 33-2 of Traveling B is selected by being touched with the finger 4, as illustrated in FIG. 11C, only the thumbnail image group 33-2 of Traveling B that has been selected remains on the screen.

Figure 12A:
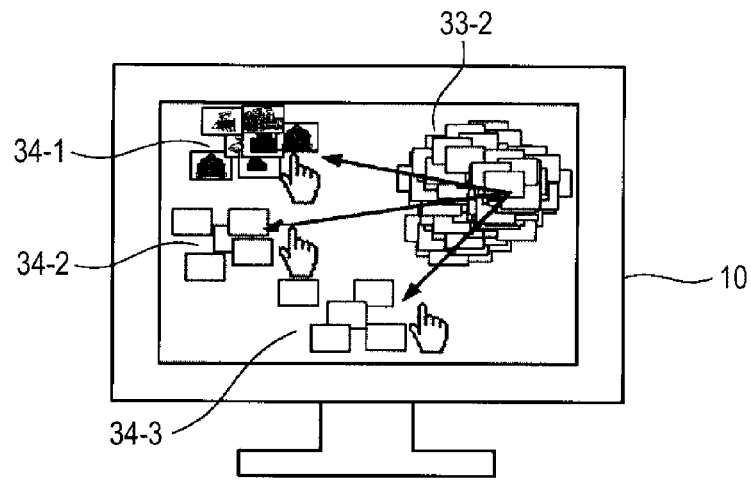
FIGS. 12A to 12C are diagrams (2) illustrating another example of the touch UI of a large-sized external output device.
Figure 12B:
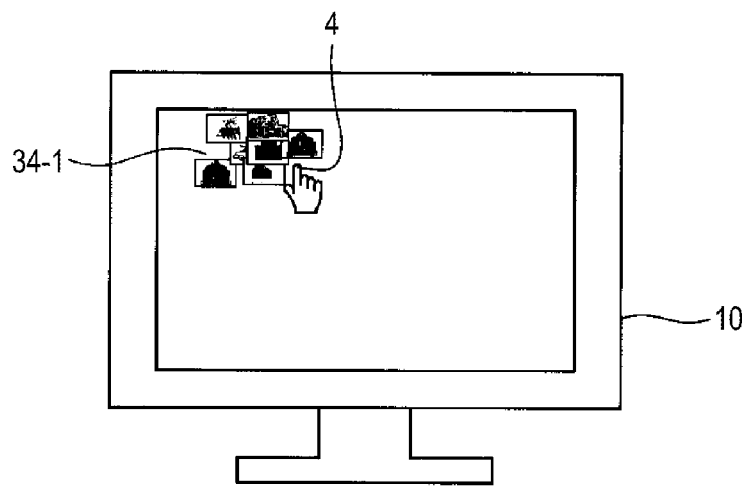
Figure 12C:
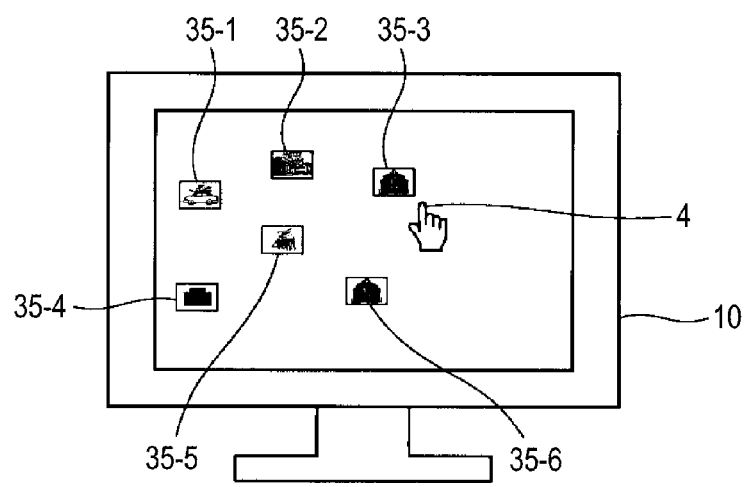

FIGS. 12A to 12C are diagrams (2) illustrating another example of the touch UI of the external output device 10. Here, as illustrated in FIG. 12A, such an operation can be performed in which, for a portion of the thumbnail image group 33-2 of Traveling B that is desired to be viewed in detail, a set that forms a group to some degree from a set of photographs is moved on the desk. In other words, when the finger 4 is slid from a portion corresponding to the thumbnail image group 33-2 of Traveling B to another portion on the screen, as illustrated in FIG. 12A, the thumbnail image groups 34-1 to 34-3 in which thumbnail images are formed in several groups can be moved in the direction in which the finger 4 slides.

Then, the portion of a thumbnail image group, in which the user is interested, out of the moved thumbnail image groups 34-1 to 34-3 is touched with a finger. For example, when the portion of the thumbnail image group 34-1 is touched with a finger, as illustrated in FIG. 12B, the thumbnail image groups other than the selected thumbnail image group 34-1 are removed from the screen. Thereafter, as illustrated in FIG. 12C, thumbnail images 35-1 to 35-6 included in the selected thumbnail image group 34-1 are displayed by being extended over the entire screen.

Figure 13A:
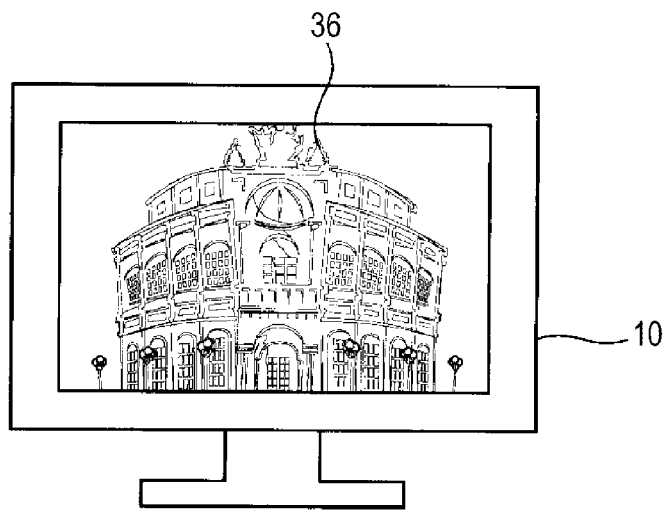
FIGS. 13A to 13C are diagrams (3) illustrating another example of the touch UI of a large-sized external output device.
Figure 13B:
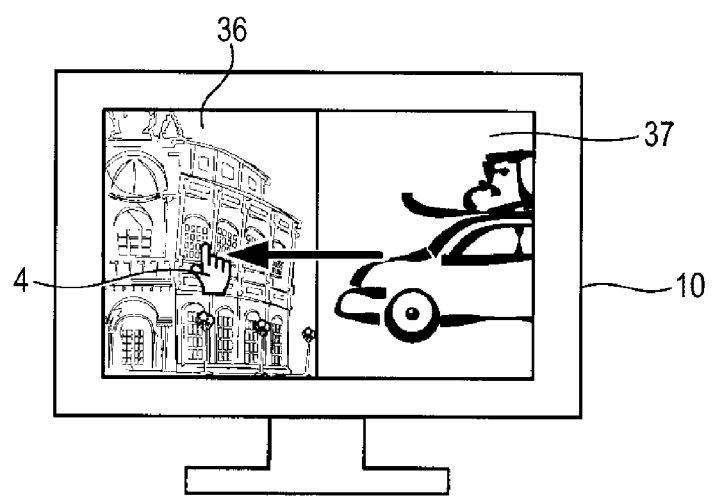
Figure 13C:
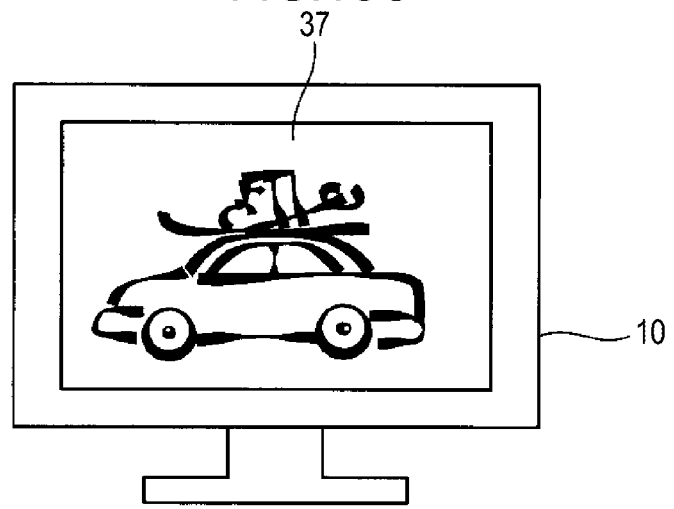

FIGS. 13A to 13C are diagrams (3) illustrating another example of the touch UI of the external output device 10. When a thumbnail image desired to be viewed is selected from among the thumbnail images 35-1 to 35-6 illustrated in FIG. 12C, as illustrated in FIG. 13A, a selected image 36 acquired by enlarging the selected thumbnail image is displayed on the full screen. Then, as illustrated in FIG. 13B, when the finger 4 or the like is slid on the screen, for example, to the left side, the selected image 36 moves to the left side in accordance with the movement of the finger 4, and, as illustrated in FIG. 13C, the display is switched to a next image 37.

It is difficult to realize such a UI in which an image can be intuitively selected from among a plurality of images in a small screen such as a screen of a mobile device, and the UI can be realized only in a large screen. In other words, in order to realize the UI, an external output device such as a display apparatus that is connected to a large-screen television set in which a touch panel is mounted or a personal computer is necessary. However, the above-described touch UI can be realized by using an existing ordinary external output device in which a touch panel is not mounted by connecting a twin-lens camera-attached reproduction apparatus according to an embodiment of the present invention to the ordinary external output device.

[Internal Configuration of Twin-lens Camera-Attached Reproduction Apparatus]

Figure 14:
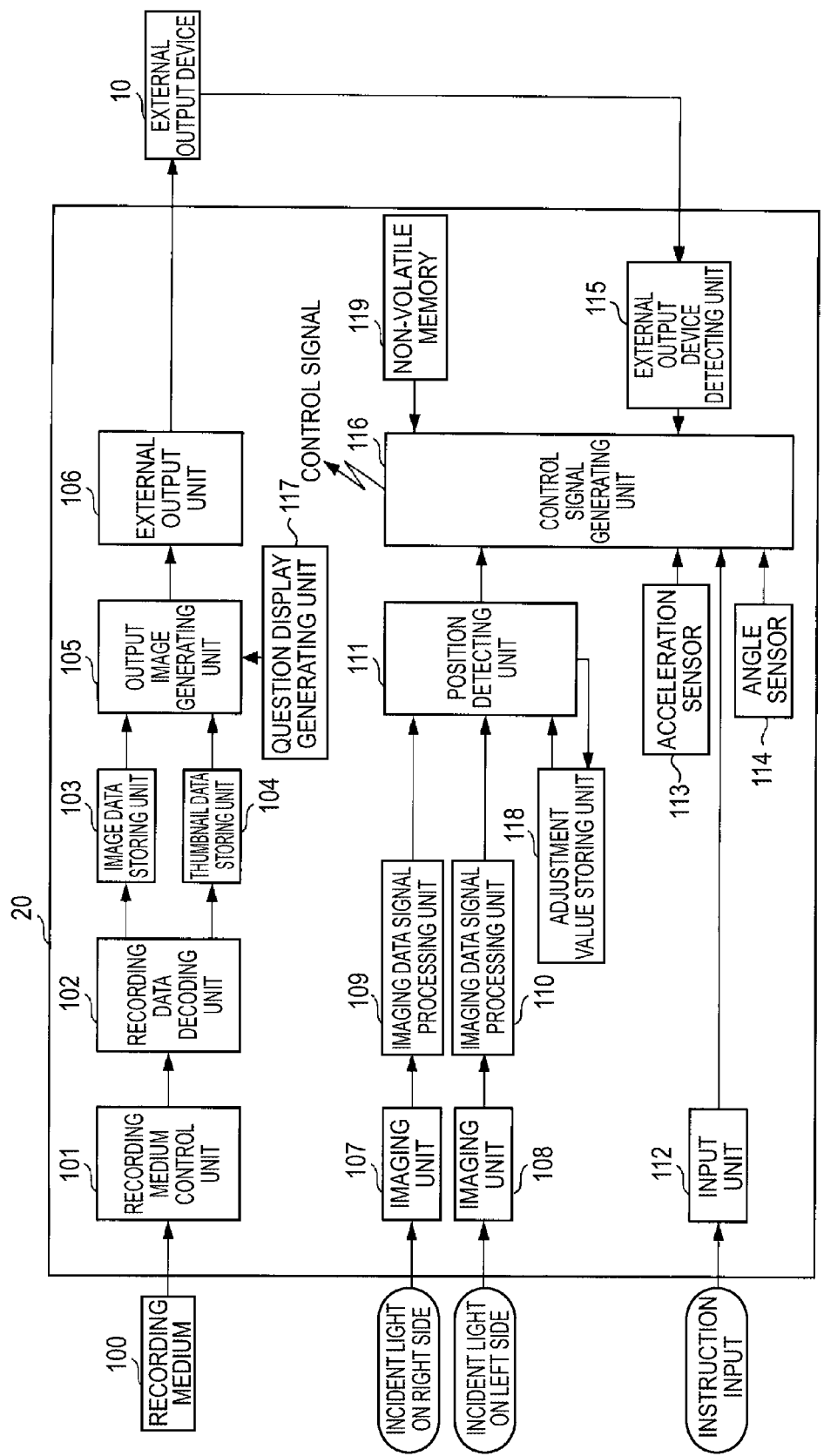
FIG. 14 is a block diagram illustrating an example of the internal configuration of a twin-lens camera-attached reproduction apparatus according to an embodiment of the present invention.

FIG. 14 is a block diagram illustrating an example of the internal configuration of a twin-lens camera-attached reproduction apparatus 20 according to an embodiment of the present invention. The reproduction apparatus 20 is mainly configured by three functions of a "reproduction function", "a position detecting function", and an "instruction input function". Each of these functions is configured by various functions described below. The reproduction apparatus 20 includes the functions of a recording medium control unit 101, a recording data decoding unit 102, an image data storing unit 103, a thumbnail data storing unit 104, an output image generating unit 105, an external output unit 106, a question display generating unit 117, and a control signal generating unit 116, as the reproduction function. In addition, the reproduction apparatus 20 includes the functions of an imaging unit 107 (the right side), an imaging unit 108 (the left side), an imaging data signal processing unit 109 (the right side), an imaging data signal processing unit 110 (the left side), a position detecting unit 111, an adjustment value storing unit 118, and a control signal generating unit 116, as the position detecting function. Furthermore, the reproduction apparatus 20 includes the functions of an input unit 112, an acceleration sensor 113, an angle sensor 114, an external output device detecting unit 115, and a control signal generating unit 116, as the instruction input function.

First, various functions included in the reproduction function will be described. The recording medium control unit 101 reads out video data by controlling a recording medium 100 on which video data acquired by performing photographing and recording is recorded by using the photograph function included in the reproduction apparatus 20 according to the embodiment of the present invention or another photographing device. The video data read out from the recording medium 100 by the recording medium control unit 101 is transmitted to the recording data decoding unit 102. As the recording medium 100, a semiconductor memory, a disc medium such as a CD, a DVD, or a Blu-ray Disc (a registered trademark), a hard disk, or the like can be used. In the example illustrated in FIG. 14, the recording medium 100 is described as an external medium. However, the recording medium 100 may be built into the reproduction apparatus 20. In addition, the video data may be recorded in a server or the like that is present on a network connected to the reproduction apparatus 20 through wireless communication.

The recording data decoding unit 102 receives the video data read out from the recording medium 100 from the recording medium control unit 101 and decodes the video data. In a case where a plurality of still image data is necessary or moving image data is handled, the decoding operation may be performed after the plurality of still image data or a plurality of frames of the moving image data are stored in a temporary storage unit included inside the recording data decoding unit 102 that is configured by a semiconductor memory or the like. Then, the video data is transmitted from the recording data decoding unit 102 to the image data storing unit 103, and thumbnail data is transmitted to the thumbnail data storing unit 104.

The image data storing unit 103 is configured by a semiconductor memory or the like and can temporarily record one or more sets of the still image data or one or more frames of the moving image data. The video data stored therein is transmitted to the output image generating unit 105.

The thumbnail data storing unit 104 is configured by a semiconductor memory or the like and temporarily records one or more sets of the thumbnail image data. The thumbnail data stored therein is transmitted to the output image generating unit 105.

The output image generating unit 105 is an example of an image generating unit. This output image generating unit 105 generates an output image based on the video data transmitted from the image data storing unit 103, the thumbnail data transmitted from the thumbnail data storing unit 104, the question data and the option button data transmitted from the question display generating unit 117, and the touch position information transmitted from the position detecting unit 111 through the control signal generating unit 116.

For example, in a case where a full-screen display of an image corresponding to video data is performed, or in a case where a plurality of images corresponding to video data are displayed, an output image is generated by using the video data transmitted from the image data storing unit 103. On the other hand, in a case where a thumbnail list screen is desired to be generated, an output image is generated by using thumbnail data transmitted from the thumbnail data storing unit 104. Furthermore, in a case where a question display is desired to be performed, an output image is generated by combining the question data and the option button data that are transmitted from the question display generating unit 117. In addition, in a case where a combined image of a plurality of patterns is desired to be output, data is acquired from the image data storing unit 103, the thumbnail data storing unit 104, and the question display generating unit 117 and generates an output image by combining the acquired data.

In addition, the output image generating unit 105 may change the display position, the display content, or the like of an image corresponding to each piece of video data displayed on the screen of the external output device 10 based on touch position information on the pointer. Then, the output image generating unit 105 transmits the data of the generated output image to the external output unit 106. Here, the output image generating unit 105 is also one element configuring an image display control unit that controls an image display on the display screen (in this example, the external output device 10).

The question display generating unit 117 configures the image generating unit together with the output image generating unit 105. This question display generating unit 117 determines a question to be displayed and the positions of option buttons displayed as icons and transmits the question data and the option button data to the output image generating unit 105, in accordance with a question display command transmitted from the control signal generating unit 116.

The external output unit 106 outputs the output image data generated by the output image generating unit 105 to the outside thereof (in this example, the external output device 10) and configures the image display control unit together with the output image generating unit 105. This external output unit 106 is connected to the external output device 10 using an HDMI (High Definition Multimedia Interface) or the like and has a function of displaying the output image data generated by the output image generating unit 105. As a connection method thereof, not only a connection method such as the HDMI that uses a cable but also a connection method such as a UWB (Ultra Wide Band) using wireless communication may be used.

Next, various functions included in the position detecting function will be described. The imaging unit 107, which is disposed on the right side, is one of imaging devices provided on the left and right sides of the reproduction apparatus 20. The imaging unit 107 forms an optical image of a subject on an imaging device such as a CCD (Charge Coupled Device) or a CMOS (Complementary Metal Oxide Semiconductor) sensor that is built therein and transmits an electrical signal accumulated in the imaging device to the imaging data signal processing unit 109.

The imaging unit 108, which is disposed on the left side, is one of the imaging devices provided on the left and right sides of the reproduction apparatus 20 and has the same function as that of the imaging unit 107.

The imaging data signal processing unit 109 performs a resolution conversion or a correction process, and the like for the imaging data received from the imaging unit 107 and transmits the imaging data for which various processes have been performed to the position detecting unit 111.

The imaging data signal processing unit 110, similarly to the imaging data signal processing unit 109, performs various processes for the imaging data received from the imaging unit 108 and transmits the processed imaging data to the position detecting unit 111.

The adjustment value storing unit 118 is an example of a position information storing unit and is configured by a semiconductor memory or the like. The adjustment value storing unit 118 records correction data (a correction value) received from the position detecting unit 111 at the time of calibration. On the other hand, the adjustment value storing unit 118 transmits the recorded correction data to the position detecting unit 111 at the time of detecting a touch position. The adjustment value storing unit 118 is configured by a semiconductor memory or the like.

The position detecting unit 111 calculates the position (touch position) of the pointer on the screen based on the image information received from the imaging data signal processing unit 109, the imaging data signal processing unit 110, and the correction data received from the adjustment value storing unit 118. The calculated position information is transmitted to the control signal generating unit 116.

Next, various functions included in the instruction input function will be described. The input unit 112 receives input signals from various input devices mounted in the reproduction apparatus 20 and decodes the received input signals in accordance with a user's instruction input and transmits a command that is included in the input signal to the control signal generating unit 116. Examples of the input device include a push switch, a touch panel, a remote controller (using infrared rays, a wireless LAN, or the like), and the like.

The acceleration sensor 113 measures the acceleration of the reproduction apparatus 20 and transmits the measured acceleration to the control signal generating unit 116.

The angle sensor 114 is configured by an acceleration sensor, a gravity sensor, and the like. The angle sensor 114 measures the angular state in the direction toward the reproduction apparatus 20 and transmits the measured angle information to the control signal generating unit 116.

The external output device detecting unit 115 detects that the reproduction apparatus 20 is connected to the external output device 10 and notifies the control signal generating unit 116 of the connection. In a case where device information of the external output device 10 can be received by using technology such as HDMI-CEC (HDMI-Consumer Electronics Control), the external output device detecting unit 115 transmits the received device information to the control signal generating unit 116 as well.

Finally, the control signal generating unit 116 is an example of a control unit and is responsible for controlling the reproduction function, the position detecting function, the instruction input function, and the like. In other words, the control signal generating unit 116 generates control signals based on the information received from the input unit 112, the acceleration sensor 113, the angle sensor 114, the external output device detecting unit 115, and the position detecting unit 111 and issues a control signal to each unit. This control signal generating unit 116, for example, may be configured by a CPU (Central Processing Unit) or the like and realizes the function of each unit by reading a computer program, which is used for a control operation, recorded in a non-volatile memory 119 that is configured by a semiconductor memory or the like into a work memory (not shown in the figure) and executing the read computer program. Alternatively, it may be configured such that a computer program is stored in the memory card 24 (see FIGS. 4A to 4E), and the control signal generating unit 116 reads out the computer program from the memory card 24 and executes the read computer program.

[Operation of Twin-lens Camera-Attached Reproduction Apparatus]

Figure 15:
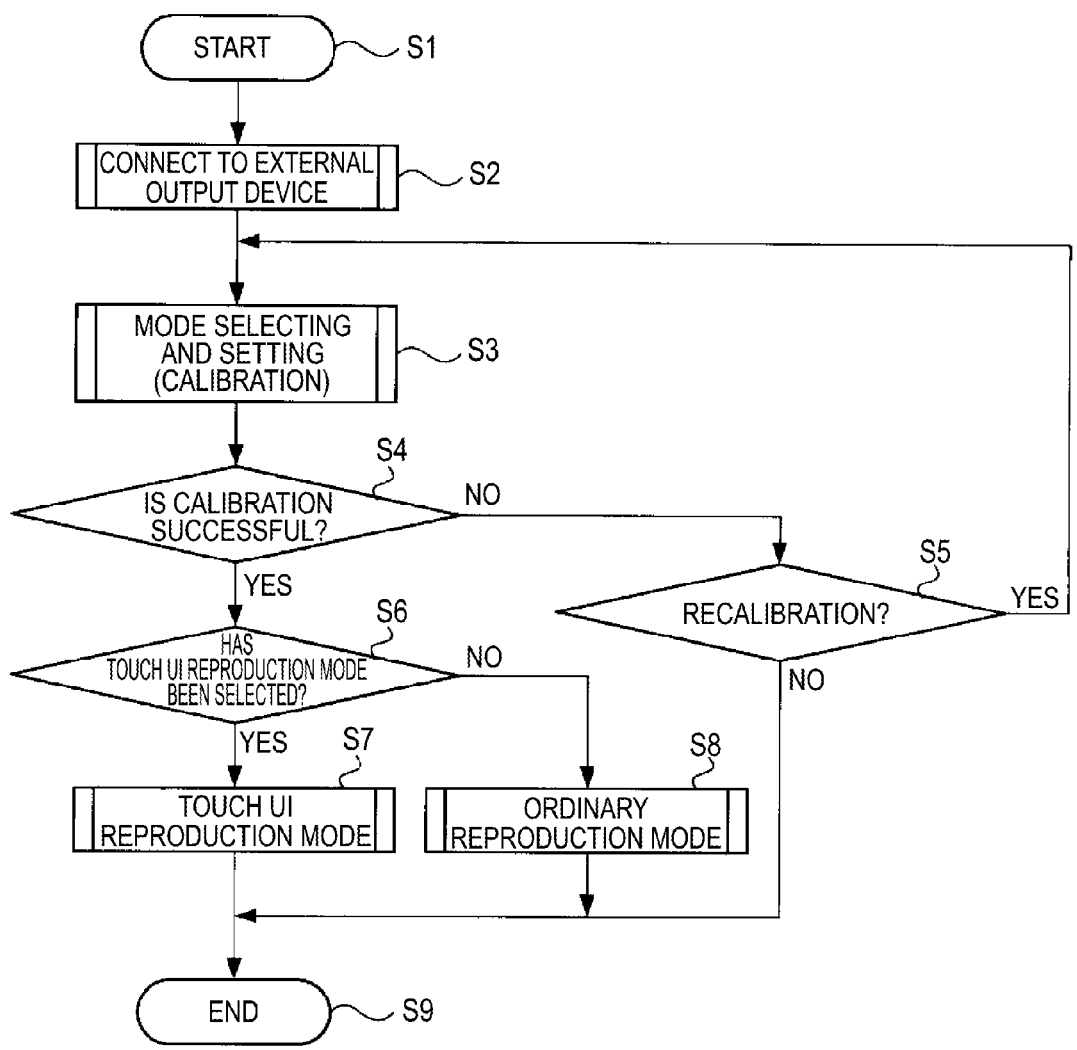
FIG. 15 is a flowchart illustrating an overview of the operation of the twin-lens camera-attached reproduction apparatus shown in FIG. 14.

FIG. 15 is a flowchart illustrating an overview of the operation of the twin-lens camera-attached reproduction apparatus 20 shown in FIG. 14. First, in Step S1, the control signal generating unit 116 receives an input signal according to a start-up instruction of the user from the input device and turns on the power of the reproduction apparatus 20 and proceeds to Step S2.

In Step S2, the control signal generating unit 116 receives from the external output device detecting unit 115 a notification indicating that the reproduction apparatus 20 and the external output device 10 are interconnected so as to be communicatable and proceeds to Step S3. Tis process will be described later in detail.

In Step S3, the control signal generating unit 116 prompts a user's selection or setting by displaying an image including option buttons (icons) for the mode selection or settings on the screen of the external output device 10. Then, the control signal generating unit 116 specifies an icon that is selected by a pointing device from among a plurality of icons based on the position of the pointing device, which is detected by the position detecting unit 111, on the screen. Next, the control signal generating unit 116 calibrates the position of the pointer that is detected by the position detecting unit 111 based on the position of the icon, which is stored in the adjustment value storing unit 118, that is specified to have been selected. As the user performs selection of a desired option button or settings while seeing the image including the options displayed on the screen, the control signal generating unit 116 calibrates the optical touch panel on the background in parallel with the user operation and proceeds to Step S4. This process will be described later in detail.

In Step S4, the control signal generating unit 116 determines whether or not the calibration is successful. The process proceeds to Step S6 in a case where the calibration is successful, and the process proceeds to Step S5 in a case where the calibration is not successful.

In Step S5, the control signal generating unit 116 determines whether or not calibration is to be performed again. For example, as the criterion of the determination, a detection of user's selection of recalibration through an operation of an option button may be used. Alternatively, it may be configured such that a screen for selecting the left/right side, which is used for allowing the user to select whether to perform recalibration, is output to the external output device 10, and a selected side is acquired by photographing by using the imaging units 107 and 108 and recognizing the side on which the pointer such as a finger is present. Alternatively, it may be determined that calibration will be repeated until the calibration is not successful up to three times, and the calibration is completed at the fourth time, as an initial setting or the like. When recalculation is selected to be performed based on this as the determination process, the process proceeds to Step S3. On the other hand, when recalculation is selected not to be performed, the process proceeds to Step S9 and is completed.

In Step S6, the control signal generating unit 116 determines whether or not a touch UI reproduction mode is selected by the user. When the touch UI reproduction mode is selected, the process proceeds to Step S7. On the other hand, when the touch UI reproduction mode is not selected, the process proceeds to Step S8.

In Step S7, the control signal generating unit 116 operates the touch UI reproduction mode. When the touch UI reproduction mode is completed, the process proceeds to Step S9. This process will be described later in detail.

In Step S8, the control signal generating unit 116 operates an ordinary reproduction mode. When the ordinary reproduction mode is completed, the process proceeds to Step S9. This process will be described later in detail.

In Step S9, when detecting power off, mode switching, disconnection of the reproduction apparatus 20 from the external output device 10, or the like, the control signal generating unit 116 completes the operation.

[Process of Connecting Reproduction Apparatus and External Output Device]

Figure 16:
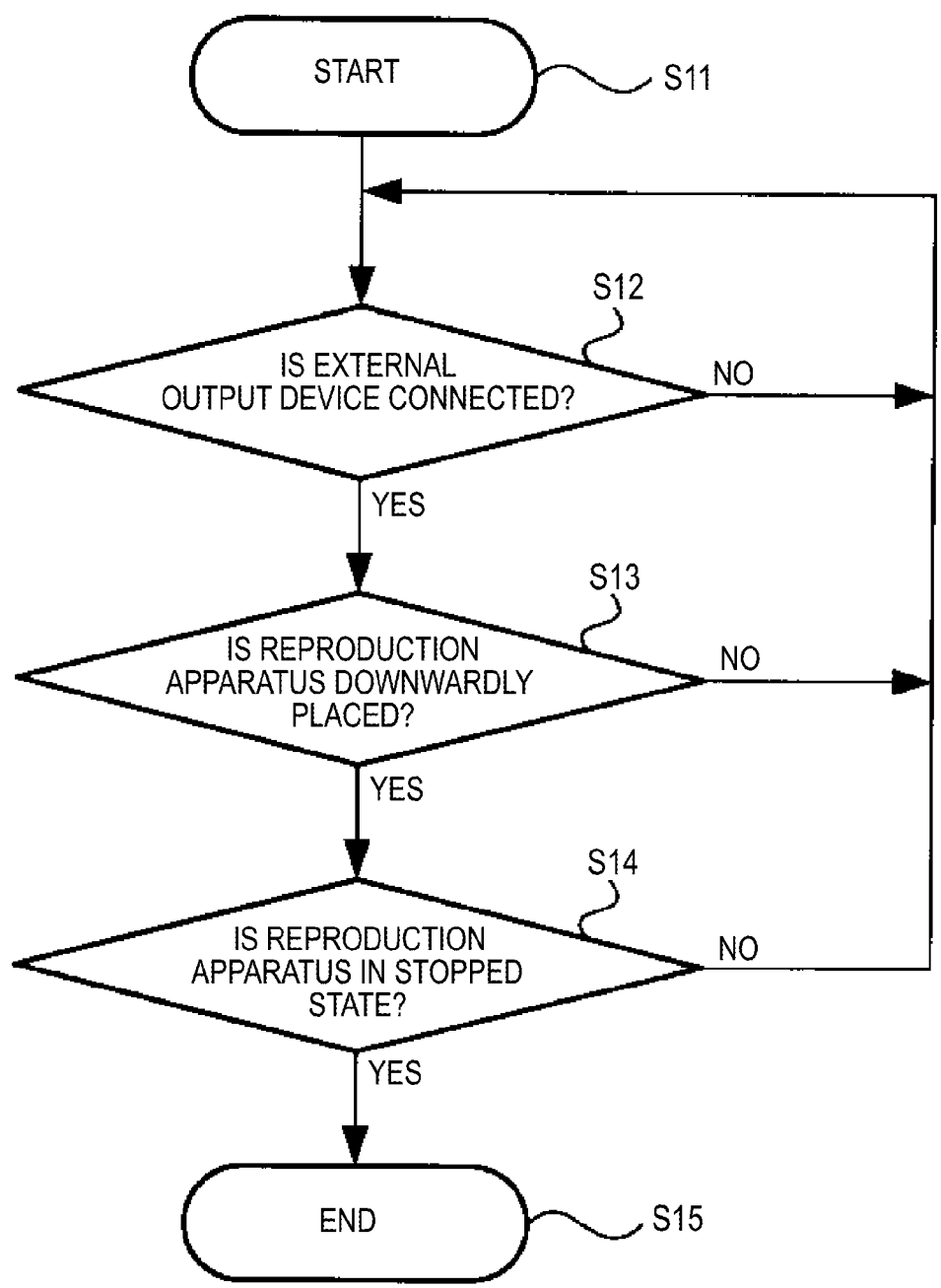
FIG. 16 is a flowchart representing a process of connecting the twin-lens camera-attached reproduction apparatus shown in FIG. 14 and an external output device.

Next, a process of connecting the reproduction apparatus 20 and the external output device 10 to each other in Step S2 illustrated in FIG. 15 will be described with reference to the flowchart illustrated in FIG. 16. First, in Step S11, the operation is started when the power of the reproduction apparatus 20 is turned on.

In Step S12, the reproduction apparatus 20 is physically connected to the external output device 10 by using an HDMI cable or the like. Then, the external output device detecting unit 115 detects a connection between the reproduction apparatus 20 and the external output device 10 and transmits an external output device connection signal to the control signal generating unit 116. When receiving the external output device connection signal transmitted from the external output device detecting unit 115, the control signal generating unit 116 proceeds to Step S13. On the other hand, when an external output device 10 is not connected thereto, the process stands by until the external output device 10 is connected thereto.

In Step S13, as a premise, it is assumed that the reproduction apparatus 20 is downwardly arranged on the upper portion of the frame 11 of the external output device 10. In a case where a connection portion (a connector or the like) used for connection with the reproduction apparatus 20 is placed on the external output device 10 side or a clip or the like that is used for being pinched into the external output device 10 is attached to the reproduction apparatus 20 side, mounting is performed by using these at the time of mounting. In a case where the connection portion used for connection with the reproduction apparatus 20 is placed on the external output device 10 side, a connection with the external output device 10 may be implemented not through a cable but through the connection portion.

Here, the control signal generating unit 116 checks whether or not the reproduction apparatus 20 is downwardly placed based on the angle information transmitted from the angle sensor 114. When the reproduction apparatus 20 is determined to be downwardly placed, a downward placement signal is transmitted from the angle sensor 114 to the control signal generating unit 116, and the process proceeds to Step S14. On the other hand, when the reproduction apparatus 20 is determined not to be downwardly placed, the process proceeds to Step S12.

In Step S14, the control signal generating unit 116 checks whether or not the reproduction apparatus 20 is in a stopped state based on the acceleration information transmitted from the acceleration sensor 113. When the reproduction apparatus 20 is determined to be in the stopped state, a stop state signal is transmitted from the acceleration sensor 113 to the control signal generating unit 116, and the process proceeds to Step S15. On the other hand, when the reproduction apparatus 20 is determined not to be in the stopped state, the process proceeds to Step S12.

Then, in Step S15, the control signal generating unit 116 completes the operation according to the flowchart.

In this embodiment, an example has been described in which a connection of the reproduction apparatus 20 with the external output device 10 or arrangement of the reproduction apparatus 20 on the upper side of the external output device 10 is recognized, then, Step S2 represented in FIG. 15 is completed, and the process proceeds to Step S3. However, it may be configured that the reproduction apparatus 20 does not recognize the state thereof after being connected to the external output device 10, and the process proceeds to Step S3 in a case where a button disposed on the reproduction apparatus 20 or the like is pressed by the user.

In addition, the arrangement form of the reproduction apparatus 20 can be considered to be any one of the forms represented in FIGS. 5 to 9. However, here, it is assumed that the reproduction apparatus 20 is arranged according to the form represented in FIG. 5 for the description.

When the arrangement of the reproduction apparatus 20 is completed, it is necessary to calibrate the optical touch panel as described above. The reproduction apparatus 20 has a feature of performing calibration without being recognized by the user while a menu or the like is selected by the user.

[Calibration Mode]

Figure 17:
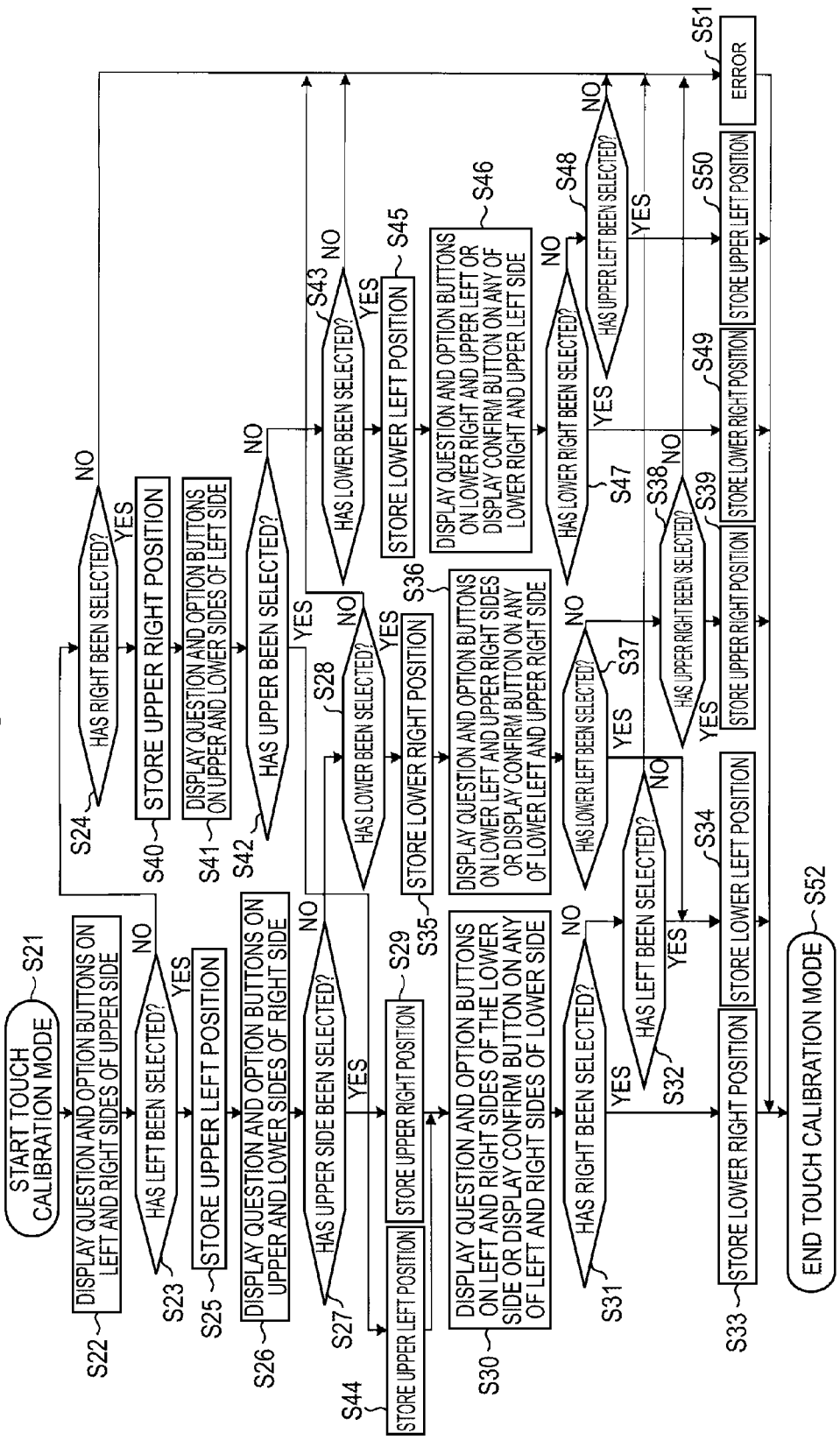
FIG. 17 is a flowchart representing the process of the twin-lens camera-attached reproduction apparatus shown in FIG. 14 in a calibration mode.

Next, the selecting and the setting (calibration) of a mode in Step S3 represented in FIG. 15 will be described with reference to the flowchart illustrated in FIG. 17.

First, in Step S21, when the reproduction apparatus 20 and the external output device 10 are connected to each other, and the reproduction apparatus 20 is arranged on the external output device 10, a reproduction apparatus arrangement completing signal is transmitted to each unit from the control signal generating unit 116, and the process proceeds to Step S22.

In Step S22, when the question display generating unit 117 receives the reproduction apparatus arrangement completing signal from the control signal generating unit 116, the question display generating unit 117 generates a question, for example, as an OSD (On Screen Display) and transmits the question data to the output image generating unit 105. The output image generating unit 105 configures a screen output by appropriately arranging OSD data such as the question received from the question display generating unit 117, an upper left button, and an upper right button.

Figure 18:
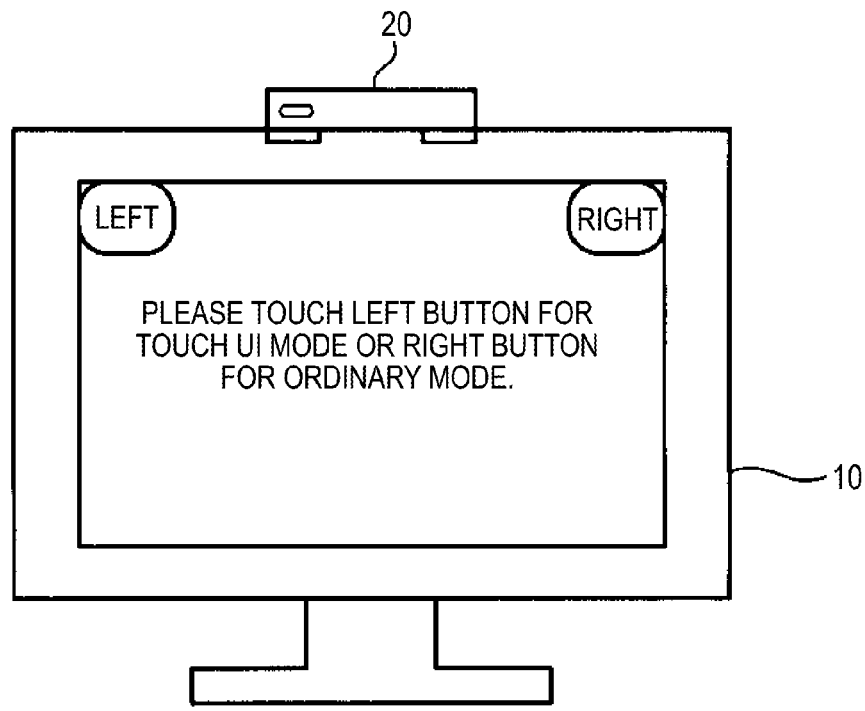
FIG. 18 is a diagram illustrating an example of a question (upper left and upper right) displayed on the optical touch panel using the twin-lens camera-attached reproduction apparatus shown in FIG. 5 in the calibration mode.

Here, an image corresponding to the OSD data of "a question, an upper left button, and an upper right button", for example, has a configuration as that illustrated in FIG. 18. Here, the question has a content of "Please touch a button disposed on the left side for a touch UI mode or a button disposed on the right side for an ordinary mode". However, the content of the question is not limited to this example. The output image is transmitted from the output image generating unit 105 to the external output unit 106 and is transmitted to the external output device 10 by the external output unit 106. Then, the question and the option buttons are displayed on the screen of the external output device 10. When completing the process of displaying the question, the control signal generating unit 116 proceeds to Step S23.

In Step S23, the imaging unit 107 for the right side and the imaging unit 108 for the left side acquire imaging data and transmit the acquired imaging data to the imaging data signal processing unit 109 and the imaging data signal processing unit 110. The imaging data signal processing units 109 and 110 perform a process such as a noise eliminating process, a resolution converting process, or the like for the imaging data acquired from the imaging units 107 and 108.

Here, mask processing that is a process performed by the imaging data signal processing units 109 and 110 will be described.

Figure 25:
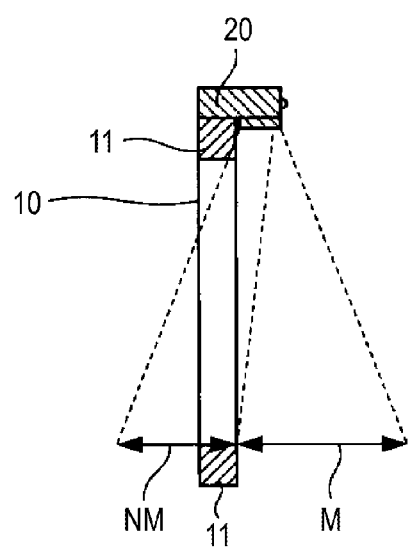
FIG. 25 is a cross-sectional view of an optical touch panel using a twin-lens camera-attached reproduction apparatus.
Figure 26:
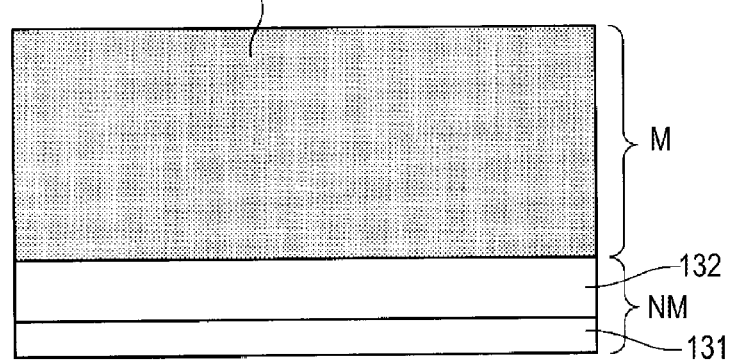
FIG. 26 is a diagram illustrating an example of an image acquired by a twin-lens camera.

FIG. 25 is a cross-sectional view of the external output device 10 (see FIG. 5), in which the reproduction apparatus 20 is mounted on the upper portion of the frame 11, taken along line A-A. FIG. 26 is an example of an image that is acquired by the imaging units 107 and 108 of the reproduction apparatus 20. A mask processing is performed for an area M of a portion, which is located in a direction opposite to the external output device 10 (a dark portion illustrated in FIG. 26), out of the images acquired by the imaging units 107 and 108. An area NM illustrated in FIG. 26 is an effective area and is configured by an image 131 corresponding to the frame 11 and an image 132 corresponding to the screen of the external output device 10.

A pointer such as a finger or a pen that is in contact with the screen of the external output device 10 is detected from the imaging data acquired from the imaging units 107 and 108. However, an image that is disposed on a side that is far away from the external output device 10 is only noise and is needless. Accordingly, by performing mask processing in advance, more precise position detection can be performed. The imaging data acquired by the imaging data signal processing units 109 and 110 is transmitted to the position detecting unit 111.

When a user touches the upper left button or the upper right button on the screen illustrated in FIG. 18 with a pointer such as a finger or a pen, the imaging units 107 and 108 photograph the pointer, and the imaging data is transmitted to the position detecting unit 111 as described above.

Then, the position detecting unit 111 detects whether the location of the option button that has been touched with the pointer is on the left side or the right side. The position detecting unit 111 checks the location of the option button based on a side on which the pointer is detected from the center of the imaging data captured by the imaging units 107 and 108. As methods of detecting an object based on diagnostic imaging, various methods are known. For example, there is a method in which detection is performed based on the color of the pointer, a method in which a stopped object that has been moving until that moment is detected, a method in which an image several frames before is detected and an object that was not recognized several frames before but is recognized is detected, and the like. In addition, any method may be used such as a method described with reference to FIG. 1 in which a reflective plate is attached to the frame 11 of the external output device 10, infrared rays or the like are emitted, and a portion from which the infrared rays are not reflected is recognized.

Figure 27A:
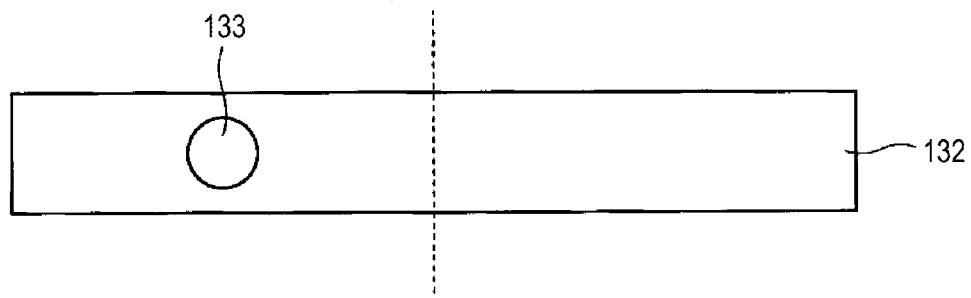
FIGS. 27A and 27B are diagrams illustrating recognition of the position of an object.
Figure 27B:
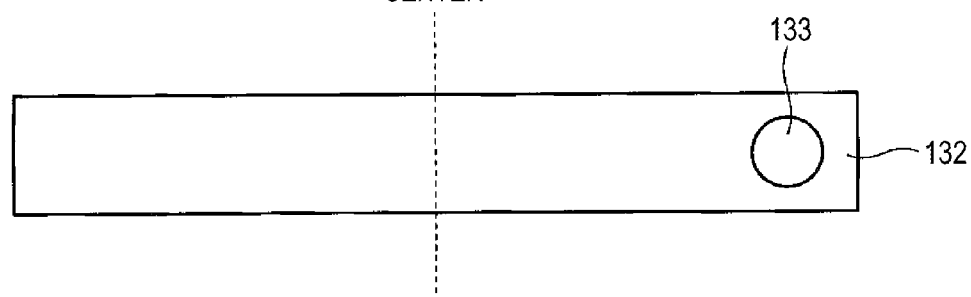

In the imaging data acquired by the imaging units 107 and 108, when the object 133 is located on the left side from the center of the image 132 corresponding to the screen as illustrated in FIG. 27A, the position detecting unit 111 can recognize that the object 133 is present on the left side. On the other hand, as illustrated in FIG. 27B, when the object 133 is located on the right side from the center of the image 132 corresponding to the screen, the position detecting unit 111 can recognize that the object 133 is located on the right side.

In Step S23, the process proceeds to Step S25 in a case where the left option button is determined to be selected by the position detecting unit 111, but otherwise the process proceeds to Step S24.

In Step S24, the process proceeds to Step S40 in a case where the right option button is determined to be selected by the position detecting unit 111, but otherwise the process proceeds to Step S51.

In Step S25, the position detecting unit 111 stores the position by issuing an upper left position storing command to the adjustment value storing unit 118 so as to store the position of the option button detected in Step S23 as the upper left position. The upper left position data written previously is replaced with the latest data. When the storing of the position is completed, the process proceeds to Step S26.

Figure 21:
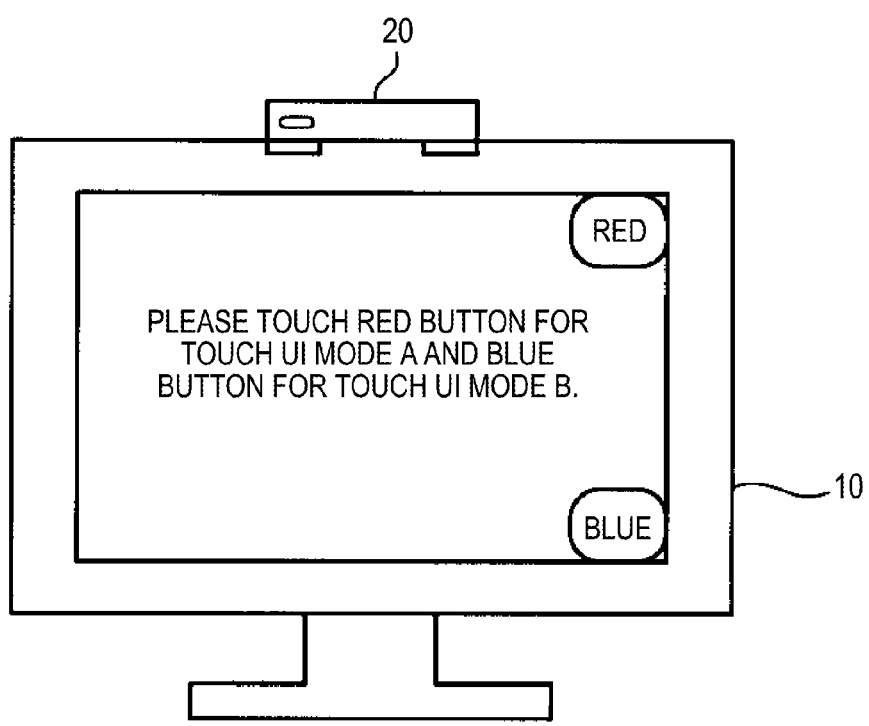
FIG. 21 is a diagram illustrating an example of a question (upper right and lower right) displayed on the optical touch panel using the twin-lens camera-attached reproduction apparatus shown in FIG. 5 in the calibration mode.

In Step S26, the units shown in FIG. 14 perform operations similar to those of Step S22, and a question, an upper right button, and a lower right button are displayed in the external output device 10, for example, in the same format as that illustrated in FIG. 21. Here, a content of the question is "Please touch a red button for touch UI mode A or a blue button for touch UI mode B". However, the content of the question is not limited to that of this example. When the display is completed, the control signal generating unit 116 proceeds to Step S27.

In Step S27, the units represented in FIG. 14 perform operations similar to those of Step S23. Then, the process proceeds to Step S29 in a case where the option button disposed on the upper side is determined to be selected by the position detecting unit 111, but otherwise the process proceeds to Step S28.

In Step S28, the process proceeds to Step S35 in a case where the option button disposed on the lower side is determined to be selected by the position detecting unit 111, but otherwise the process proceeds to Step S51.

In Step S29, the position detecting unit 111 stores the position by issuing an upper right position storing command to the adjustment value storing unit 118 so as to store the position detected in Step S27 as the upper right position. The upper right position data written previously is replaced with the latest data. When the storing of the position is completed, the process proceeds to Step S30.

Figure 20:
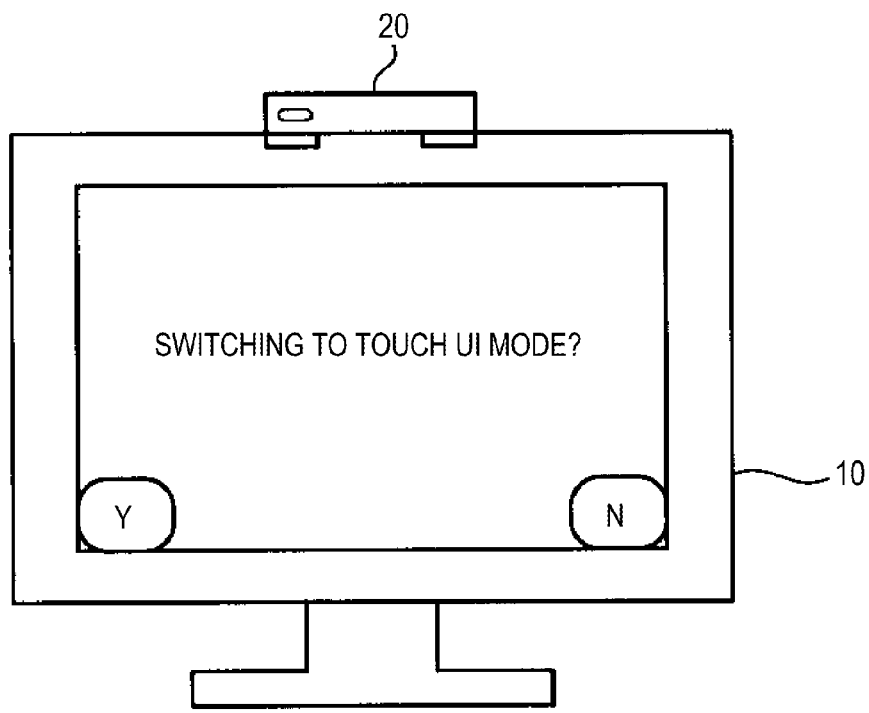
FIG. 20 is a diagram illustrating an example of a question (lower left and lower right) displayed on the optical touch panel using the twin-lens camera-attached reproduction apparatus shown in FIG. 5 in the calibration mode.
Figure 22:
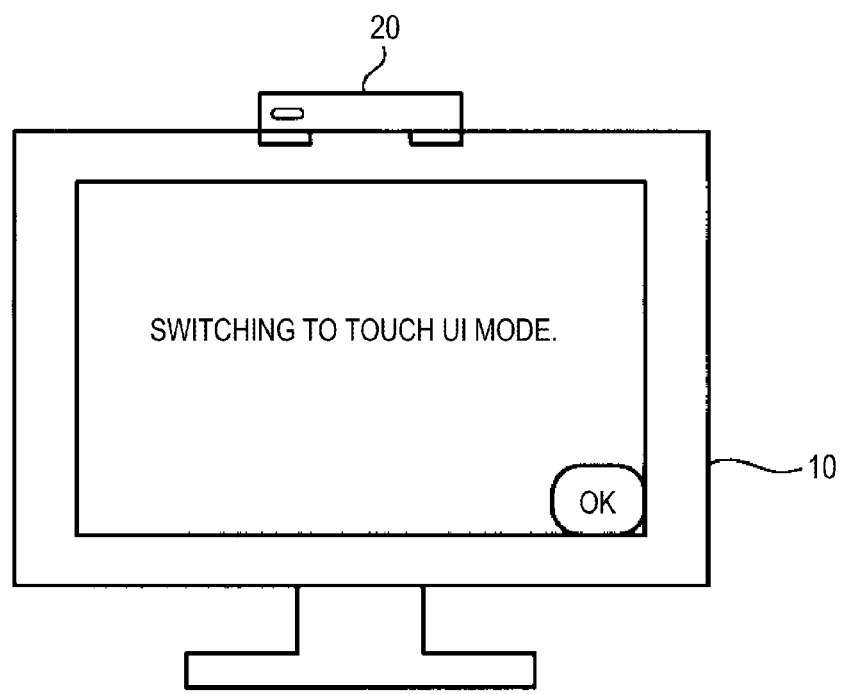
FIG. 22 is a diagram illustrating an example of a question (lower right) displayed on the optical touch panel using the twin-lens camera-attached reproduction apparatus shown in FIG. 5 in the calibration mode.

In Step S30, the units shown in FIG. 14 perform operations similar to those of Step S22, and a question, a lower left button, and a lower right button are displayed in the external output device 10, for example, in the same format as that illustrated in FIG. 20. Here, a content of the question is "Do you want switching to the UI touch mode?". However, the content of the question is not limited to that of this example. Here, the positions of at least three points may be known in the calibration process for the touch panel. Thus, for example, not a selection type in which the lower left button or the lower right button can be selected, but a consent type in which a button located at one position as illustrated in FIG. 22 is displayed on the lower left side or the lower right side so as to be allowed to be pressed by a user may be employed. When the display is completed, the control signal generating unit 116 proceeds to Step S31.

In Step S31, the units represented in FIG. 14 perform operations similar to those of Step S23. Then, the process proceeds to Step S33 in a case where the option button disposed on the right side is determined to be selected by the position detecting unit 111, but otherwise the process proceeds to Step S32.

In Step S32, the process proceeds to Step S34 in a case where the option button disposed on the left side is determined to be selected by the position detecting unit 111, but otherwise the process proceeds to Step S51.

In Step S33, the position detecting unit 111 stores the position by issuing a lower right position storing command to the adjustment value storing unit 118 so as to store the position of the option button that is detected in Step S31 as the lower right position. The lower right position data written previously is replaced with the latest data. When the storing of the position is completed, the control signal generating unit 116 proceeds to Step S52.

In Step S34, the position detecting unit 111 stores the position by issuing a lower left position storing command to the adjustment value storing unit 118 so as to store the position of the option button that is detected in Step S32 as the lower left position. The lower left position data written previously is replaced with the latest data. When the storing of the position is completed, the control signal generating unit 116 proceeds to Step S52.

In Step S35, the position detecting unit 111 stores the position by issuing a lower right position storing command to the adjustment value storing unit 118 so as to store the position of the option button that is detected in Step S28 as the lower right position. The lower right position data written previously is replaced with the latest data. When the storing of the position is completed, the control signal generating unit 116 proceeds to Step S36.

Figure 23:
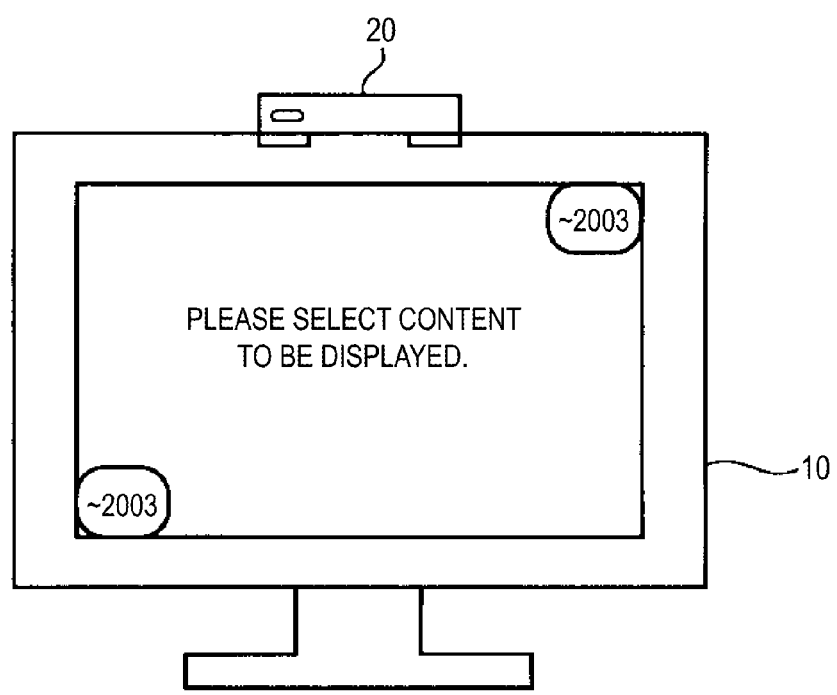
FIG. 23 is a diagram illustrating an example of a question (lower left and upper right) (1) displayed on the optical touch panel using the twin-lens camera-attached reproduction apparatus shown in FIG. 5 in the calibration mode.

In Step S36, the units shown in FIG. 14 perform operations similar to those of Step S22, and a question, a lower left button, and an upper right button are displayed in the external output device 10, for example, in the same format as that illustrated in FIG. 23. Here, the positions of at least three points may be known in the calibration process for the touch panel. Thus, for example, not a selection type in which the lower left button or the upper right button can be selected, but a consent type in which a button located at one position as illustrated in FIG. 22 is displayed on the lower left side or the upper right side so as to be allowed to be pressed by a user may be employed. When the display is completed, the control signal generating unit 116 proceeds to Step S37.

In Step S37, the units represented in FIG. 1 perform operations similar to those of Step S23. Then, the process proceeds to Step S34 in a case where the option button disposed on the lower left side is determined to be selected by the position detecting unit 111, but otherwise the process proceeds to Step S38.

In Step S38, the process proceeds to Step S39 in a case where the option button disposed on the upper right side is determined to be selected by the position detecting unit 111, but otherwise the process proceeds to Step S51.

In Step S39, the position detecting unit 111 stores the position by issuing an upper right position storing command to the adjustment value storing unit 118 so as to store the position of the option button that is detected in Step S38 as the upper right position. The upper right position data written previously is replaced with the latest data. When the storing of the position is completed, the control signal generating unit 116 proceeds to Step S52.

In Step S40, the position detecting unit 111 stores the position by issuing an upper right position storing command to the adjustment value storing unit 118 so as to store the position of the option button that is detected in Step S24 as the upper right position. The upper right position data written previously is replaced with the latest data. When the storing of the position is completed, the control signal generating unit 116 proceeds to Step S41.

Figure 19:
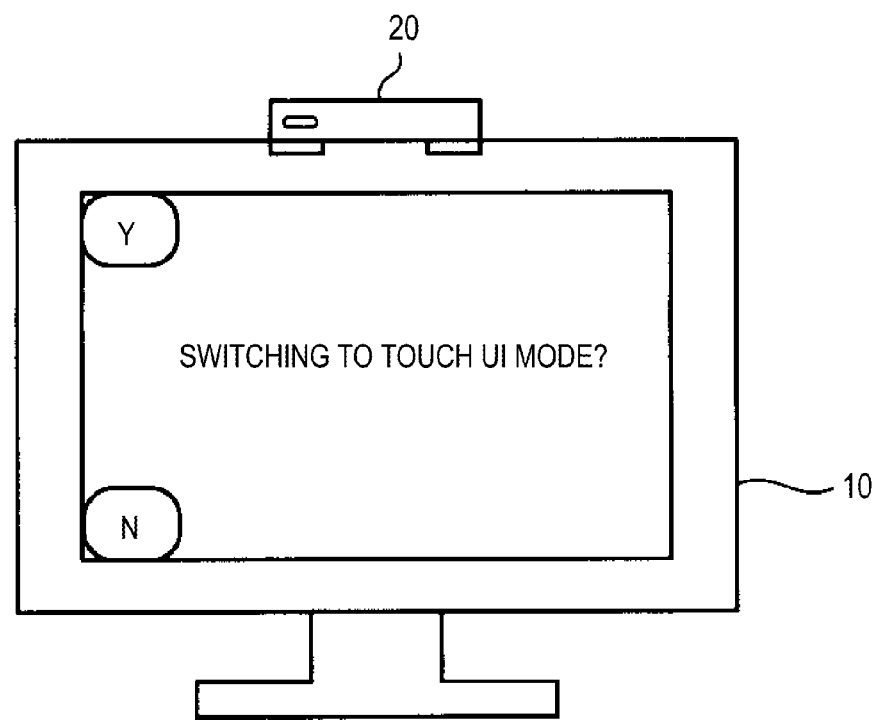
FIG. 19 is a diagram illustrating an example of a question (upper left and lower left) displayed on the optical touch panel using the twin-lens camera-attached reproduction apparatus shown in FIG. 5 in the calibration mode.

In Step S41, the units shown in FIG. 14 perform operations similar to those of Step S22, and a question, an upper left button, and a lower left button are displayed in the external output device 10, for example, in the same format as that illustrated in FIG. 19. When the display is completed, the control signal generating unit 116 proceeds to Step S42.

In Step S42, the units represented in FIG. 14 perform operations similar to those of Step S23. Then, the process proceeds to Step S44 in a case where the option button disposed on the upper side is determined to be selected by the position detecting unit 111, but otherwise the process proceeds to Step S43.

In Step S43, the process proceeds to Step S45 in a case where the option button disposed on the lower side is determined to be selected by the position detecting unit 111, but otherwise the process proceeds to Step S51.

In Step S44, the position detecting unit 111 stores the position by issuing an upper left position storing command to the adjustment value storing unit 118 so as to store the position of the option button that is detected in Step S42 as the upper left position. The upper left position data written previously is replaced with the latest data. When the storing of the position is completed, the control signal generating unit 116 proceeds to Step S30.

In Step S45, the position detecting unit 111 stores the position by issuing a lower left position storing command to the adjustment value storing unit 118 so as to store the position of the option button that is detected in Step S43 as the lower left position. The lower left position data written previously is replaced with the latest data. When the storing of the position is completed, the control signal generating unit 116 proceeds to Step S46.

Figure 24:
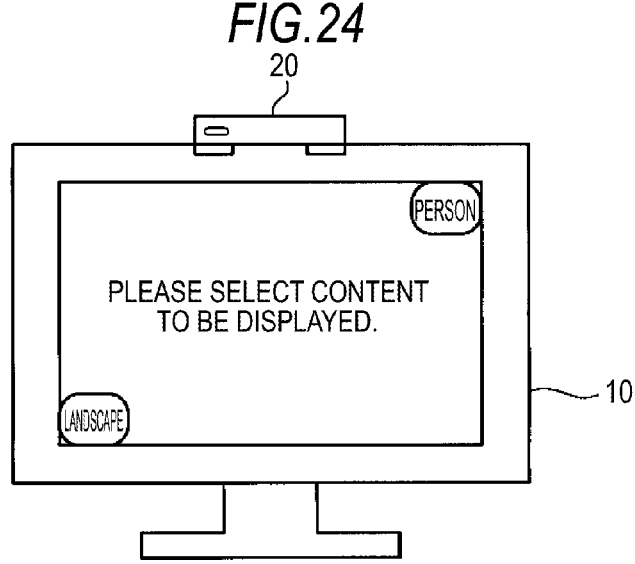
FIG. 24 is a diagram illustrating an example of a question (lower left and upper right) (2) displayed on the optical touch panel using the twin-lens camera-attached reproduction apparatus shown in FIG. 5 in the calibration mode.

In Step S46, the units shown in FIG. 14 perform operations similar to those of Step S22, and a question, a lower right button, and an upper left button are displayed in the external output device 10, for example, in the same format as that illustrated in FIG. 24. Here, the positions of at least three points may be known in the calibration process for the touch panel. Thus, for example, not a selection type in which the lower right button or the upper left button can be selected, but a consent type in which a button located at one position as illustrated in FIG. 22 is displayed on the lower right side or the upper left side so as to be allowed to be pressed by a user may be employed. When the display is completed, the control signal generating unit 116 proceeds to Step S47.

In Step S47, the units represented in FIG. 14 perform operations similar to those of Step S43. Then, the process proceeds to Step S49 in a case where the option button disposed on the lower right side is determined to be selected by the position detecting unit 111, but otherwise the process proceeds to Step S48.

In Step S48, the process proceeds to Step S50 in a case where the option button disposed on the upper left side is determined to be selected by the position detecting unit 111, but otherwise the process proceeds to Step S51.

In Step S49, the position detecting unit 111 stores the position by issuing a lower right position storing command to the adjustment value storing unit 118 so as to store the position of the option button that is detected in Step S47 as the lower right position. The lower right position data written previously is replaced with the latest data. When the storing of the position is completed, the control signal generating unit 116 proceeds to Step S52.

In Step S50, the position detecting unit 111 stores the position by issuing an upper left position storing command to the adjustment value storing unit 118 so as to store the position of the option button that is detected in Step S48 as the upper left position. The upper left position data written previously is replaced with the latest data. When the storing of the position is completed, the control signal generating unit 116 proceeds to Step S52.

In Step S51, as a result of the determination process in each step, since it is difficult for the position detecting unit 111 to calculate a correct position, the position detecting unit 111 transmits an error signal to the control signal generating unit 116. Next, the control signal generating unit 116 transmits an error display command to the question display generating unit 117. When receiving the error display command, the question display generating unit 117 generates an error message and transmits the generated error message to the output image generating unit 105 so as to combine the error message as an image. Then, the output image generating unit 105 transmits the generated image to the external output device through the external output unit 106 so as to display the error message on the screen. When the display of an error message is completed, the control signal generating unit 116 proceeds to Step S52.

In Step S52, the control signal generating unit 116 completes the calibration process.

[Touch UI Reproduction Mode]

Next, the touch UI reproduction mode in Step S7 illustrated in FIG. 15 will be described. In this step, by performing the calibration process, the position of the pointer such as a finger, a hand, or a pen can be detected. Accordingly, for example, the same operation as that in "Touch UI Realized By Using External Output Device Having Large Screen" can be realized as well by using an external output device such as an ordinary display device having no touch panel by only mounting the reproduction apparatus 20 on the upper side of the external output device.

An overview of the operation through a touch UI will be described with reference to FIG. 14. When the calibration process is completed through the calibration mode process illustrated in FIG. 17, and the touch UI reproduction mode is selected, a touch UI reproduction mode starting signal is issued from the control signal generating unit 116. Accordingly, each unit is switched to the touch UI reproduction mode, and the recording medium control unit 101 starts to read video data from the recording medium 100. At that time, the video data is read out in the order of categories based on metadata or the like. For example, as illustrated in FIG. 11A, a read-out operation can be performed for the athletic festival category, the alumni association category, the traveling category, or the like in a separate manner.

The read-out video data is transmitted to the recording data decoding unit 102, and the thumbnail data is decoded and is transmitted to the thumbnail data storing unit 104. The transmitted thumbnail data is transmitted to the output image generating unit 105, and the output image generating unit 105 generates images classified into the same categories as those illustrated in FIG. 11A and are output to the external output device 10 through the external output unit 106.

Here, for example, a thumbnail image group of the traveling category is touched with the hand. Then, the imaging unit 107 and the imaging unit 108 transmit the imaged data to the position detecting unit 111 through the imaging data signal processing units 109 and 110. The position detecting unit 111 reads out calibration information stored at the time of calibration for the detected position from the adjustment value storing unit 118, so that a more precise position than that before the calibration process can be performed. Several methods of correcting a position are known, and hereinafter, brief description thereof will be presented.

[Method of Correcting Position]

Figure 28:
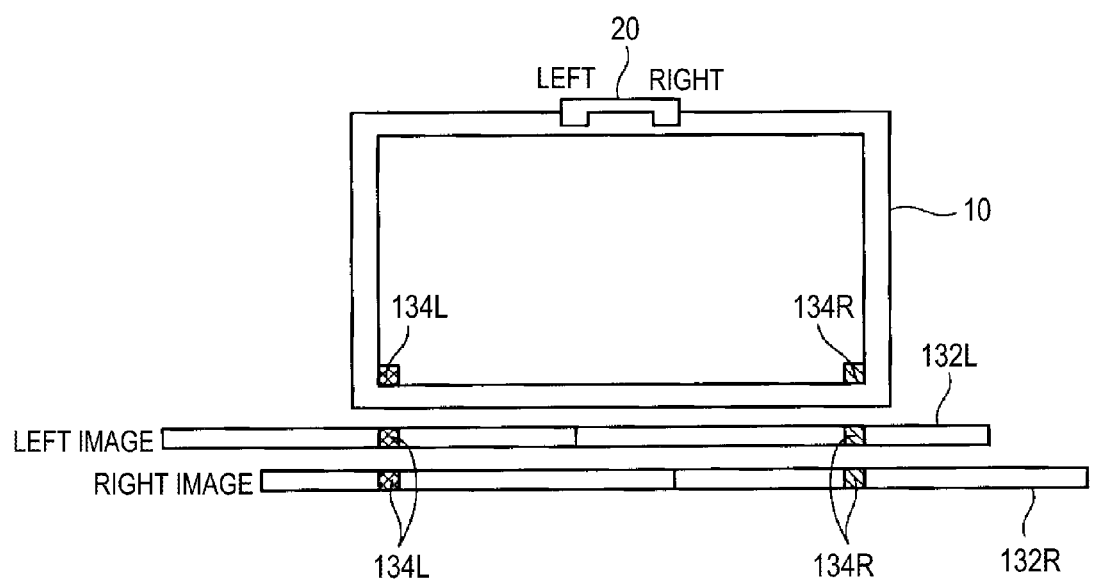
FIG. 28 is a diagram illustrating the recognition of the lower-left corner and the lower-right corner of an optical touch panel using a twin-lens camera when the twin-lens camera is mounted at the center.
Figure 29:
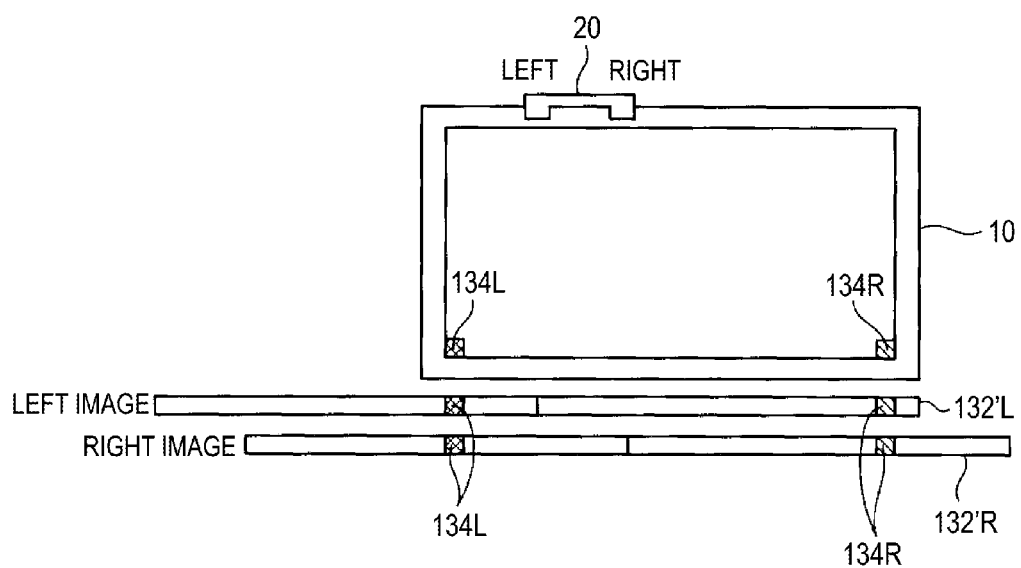
FIG. 29 is diagram illustrating the recognition of objects located on the lower-left corner and the lower-right corner of an optical touch panel using a twin-lens camera when the twin-lens camera is mounted so as to be deviated from the center.

FIG. 28 is a diagram illustrating the recognition of the lower-left corner and the lower-right corner of the optical touch panel using a twin-lens camera when the twin-lens camera is mounted at the center of the external output device 10. FIG. 29 is diagram illustrating the recognition of objects located on the lower-left corner and the lower-right corner of the optical touch panel using a twin-lens camera when the twin-lens camera is mounted so as to be deviated from the center of the upper side of the external output device 10.

For example, a lower left point 134L and a lower right point 134R on the screen are recognized at right positions, as illustrated in FIG. 28, in an image 132L captured by the imaging unit 108 for the left side and an image 132R captured by the imaging unit 107 for the right side.

Here, for example, as illustrated in FIG. 29, it is assumed that the reproduction apparatus 20 is mounted so as to be slightly deviated to the left side on the upper side of the external output device 10. In addition, in the example illustrated in FIG. 29, the reproduction apparatus 20 is assumed to be mounted so as to be parallel to the screen of the external output device 10. At this time, the lower left point 134L and the lower right point 134R are recognized at positions, which are illustrated in FIG. 29, in an image 132L' captured by the imaging unit 108 for the left side and an image 132R' captured by the imaging unit 107 for the right side. In other words, in a case where the reproduction apparatus 20 is mounted so as to be close to the left side, the lower left point 134L and the lower right point 134R are recognized at positions that are different from those in a case where the reproduction apparatus 20 is mounted at the center.

Here, it is assumed that the state in which the reproduction apparatus 20 is positioned at the center is detected by the reproduction apparatus 20 as a real state. Then, in a case where the reproduction apparatus 20 is mounted so as to be deviated to the left side as in the example illustrated in FIG. 29, all the points are recognized by the reproduction apparatus 20 as being touched toward the right side from their actual positions. Here, in a case where the lower left point is recognized at the time of the calibration process, the position that is recognized by the imaging unit 108 for the left side is stored. In addition, in a case where the lower right point is recognized, the position that is recognized by the imaging unit 107 for the right side is stored. Accordingly, when the position at the center of the position stored as the left corner and the position stored as the right corner is recognized, currently, the position when the center is touched or the like can be acquired. In other words, the correspondence relationship between the position of the pointer on the surface of the display screen and the position of the pointer on the image acquired through photographing can be adjusted.

Thus, by acquiring the positions of at least three points in the horizontal direction and the vertical direction, the touch position can be recognized. When the calibration process can be performed by using three or more points, the position can be detected with higher precision.

When detecting the position, the position detecting unit 111 transmits the position information to the control signal generating unit 116, and searches for an object that is displayed at the position, and recognizes the selection. Accordingly, for example, when a thumbnail image group of the traveling category is touched, similarly to this example, by recognizing the touch of the thumbnail image group and issuing a display command for displaying the next category to each unit from the control signal generating unit 116, the recording medium control unit 101 starts to read image data from the recording medium 100.

By reading out image data in such an order and recognizing the touch position, the above-described "Touch UI Realized By Using External Output Device Having Large Screen" can be realized also by using an external output device such as a general display device having no touch panel function by using the reproduction apparatus 20.

[Ordinary Reproduction Mode]

Next, the ordinary reproduction mode represented in Step S6 of FIG. 15 will be described. This ordinary reproduction mode is a mode in which the reproduction apparatus 20 is not used as an optical touch panel and, for example, is the same operation mode as that of a digital still camera or the like that is generally available in the market. The external output device and the reproduction apparatus are connected together, and the operation is performed not by using an optical touch panel, but the operation is performed on a display panel of the connected reproduction apparatus.

For example, when the operation described in "Touch UI Realized By Using External Output Device Having Large Screen" with reference to FIGS. 10A to 10D is performed, such a screen is displayed on a liquid crystal display panel, or thumbnail images or the like are aligned so as to be displayed on the liquid crystal display panel. A controller including cursor keys, an OK button, a cancel button, and the like is displayed on the display panel on the reproduction apparatus, and the controller is operated so as to select an image within the displayed screen. The operation may be performed using operation switches arranged on a main body of the reproduction apparatus, an external controller such as a remote controller, a display device as a connection destination, or the like. However, in order to realize a touch UI enabling an intuitive operation that can be performed only on a large screen, an external output device having a large screen on which a touch UI can be implemented is necessarily arranged.

<2. Others>

Now, automatic changing in the size of the option buttons will be described. When the option button used as a calibration point is large, a range that is pressed by the user at the time of selection for a question becomes wide at the time of the calibration process, and accordingly, the precision of position detection of the optical touch panel is decreased as that much. Finally, when an output image is displayed in the same manner as for an ordinary display device that does not have a large screen by displaying the option button in the external output device having a large screen, the size of the option buttons is increased.

Figure 30A:
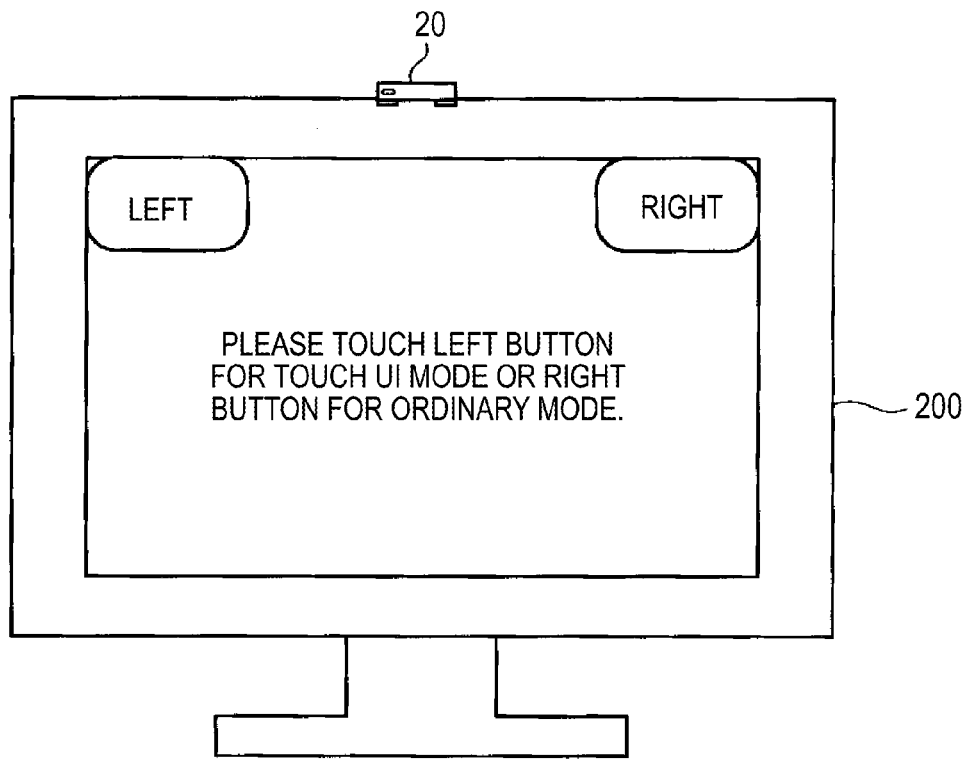
FIG. 30A illustrates an example of option buttons (upper left and upper right) displayed in a calibration mode in a case where an optical touch panel using a twin-lens camera-attached reproduction apparatus is applied to an external output device having a large screen.
Figure 30B:
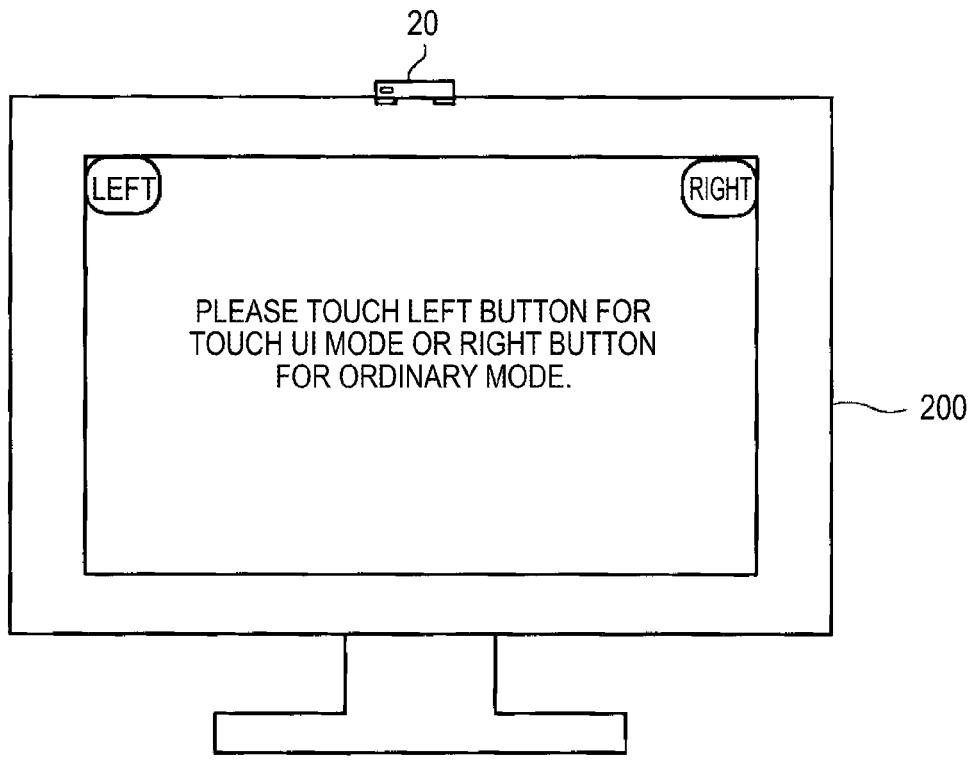
FIG. 30B is a diagram illustrating an example of option buttons (upper left and upper right) after correction of the size.

FIG. 30A illustrates an example of option buttons in a case where an optical touch panel using a twin-lens camera-attached reproduction apparatus is applied to an external output device having a large screen. FIG. 30A is an example of option buttons (on the upper left side and the upper right side) displayed in a calibration mode, and FIG. 30B is an example of option buttons (on the upper left side and the upper right side) after correction of the size. For example, when the same display as that illustrated in FIG. 18 is performed in the external output device 200 having a large screen, as illustrated in FIG. 30A, the size of the option buttons is increased, and the precision of the calibration decreases. Thus, by acquiring the screen size of the external output device 200 side in inches, for example, based on a control signal such as an HDMI CEC, the size of the option buttons is changed in accordance with the screen size in inches. In addition, the number of pixels used for displaying the option buttons may be determined in advance. FIG. 30B is an example in which the option buttons are displayed by appropriately changing the size thereof. In the example represented in FIG. 30B, since the size of the option buttons is not increased even when the screen size is increased, the calibration can be performed with high precision.

However, as described above, in performing the calibration described until now in detail, it is necessary to press three points or more. Thus, for example, in a case where it is necessary to press 30 points, it is more preferable that calibration is performed in a question form using the calibration technique according to the embodiment of the present invention on the background for five points, and ordinary calibration, in which input points are displayed so as to be forcibly pressed, is performed for the remaining 25 points. By using such a combined technique, the burden of a user can be lessened to some degree, compared to a general case.

It may be configured such that, when the acceleration sensor 113 or the angle sensor 114 that is represented in FIG. 14 detects that the reproduction apparatus mounted on the external output device is moved from the external output device, the control signal generating unit 116 issues a calibration execution command again so as to allow each unit in the calibration mode for performing automatic recalibration.

According to the above-described embodiment, a question (this does not remind a user of a calibration operation) that is different from a question exclusively used for the calibration process such as mode setting and a plurality of option buttons are displayed on the screen. In addition, a user is allowed to select an option button, and the calibration process is performed on the background in parallel with the selection operation. Accordingly, information that is necessary for the setting process and the calibration process can be simultaneously acquired in accordance with one selection operation of the user, and therefore, the burden of the user can be lessened to a large extent. For example, it is necessary to select settings in several points such as the mode to be selected at the time of switching between modes, whether imaging with a preview image viewed in the external output device is desired or a reproduction mode is desired, for example, even when a cable is connected to the external output device, and the like. At that moment, by displaying the question and the option buttons on the screen and performing the calibration process on the background at the time of selection as actual use, there is no additional operation for the user, and the calibration process can be also performed, thereby the burden of the user can be lessened.

In addition, not only a touch UI can be realized while using a general external output device having no touch sensor, but also a complicated calibration operation is performed simultaneously with performing various settings. Accordingly, a touch operation that is intuitive and can be easily understood can be performed while the burden of the user is lessened. From the opposite viewpoint, there is an advantage that a setting operation can be performed simultaneously with performing the calibration operation.

In addition, in the reproduction apparatus according to the embodiment of the present invention, when the mounting position of the reproduction apparatus with respect to the external output device is deviated, the mode is automatically switched to the calibration mode and the question display mode at the first time mounting. Accordingly, a user can perform the calibration operation without forgetting about it.

In addition, since a touch UI technology using a camera is applied to a reproduction apparatus according to an embodiment of the present invention, the recognition of the depth or the left or right side can be performed even before the calibration operation. Accordingly, the calibration operation can be performed through a question.

As above, examples of the embodiments of the present invention have been described. However, the present invention is not limited thereto. Thus, it is apparent that the present invention includes other modified examples and applied examples not departing from the concept of the present invention defined as the appended claims.

For example, in the above-described embodiment, the reproduction apparatus 20 (see FIGS. 4A to 4E or FIG. 14) has a configuration in which two imaging functions (the lens, the imaging unit, and the imaging data signal processing unit) for imaging the display screen of the external output device 10 are included. However, the present invention is not limited to this example, For example, the reproduction apparatus may have at least one imaging function, and an optical touch panel may be realized by using imaging data acquired by the reproduction apparatus having one imaging function and imaging data that is acquired by imaging the display screen by using another camera.

In addition, in the above-described embodiment, a setting process corresponding to the question and the icon selected by the user is performed, and the calibration process is performed in parallel with the setting process. However, when information that is necessary for the setting process and the calibration process can be simultaneously acquired, the order of the processed to be performed is not limited to this example. For example, the setting process may be preceded by the calibration process. In addition, it is apparent that, after a setting process corresponding to the question and the icon selected by the user is performed, the calibration process may be performed.

In the above-described embodiment, the reproduction apparatus 20 is configured to perform the calibration process based on the imaging data of the display screen that is supplied from the imaging units 107 and 108. However, the present invention is not limited thereto. For example, an external output device such as a television set having a large screen in which a touch panel is mounted or a display device connected to a personal computer, or the like may perform the calibration process based on the imaging data of the display screen.

In the description here, the process steps that define the process in a time series include not only a process that is performed in a time series in the described order but also a process that is not necessarily processed in a time series such as a process (for example, a parallel process or a process based on an object) that is performed in parallel or individually.

The present application contains subject matter related to that disclosed in Japanese Priority Patent Application JP 2010-079696 filed in the Japan Patent Office on Mar. 30, 2010, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
   an image display control unit to control an image display on a display screen;
   an image generating unit to generate a question image including a question and option buttons configured by a plurality of icons that can be arbitrarily selected for the question;
   a position detecting unit to detect a position of a pointer on the display screen from imaging data acquired by imaging the display screen;
   a position information storing unit to store positions of the plurality of icons when the question image generated by the image generating unit is displayed on the display screen; and
   a control unit to specify an icon out of the plurality of icons selected by the pointer based at least in part on the position of the pointer detected by the position detecting unit and to calibrate the position of the pointer that is detected by the position detecting unit based at least in part on the position of the icon, which is stored in the position information storing unit, corresponding to the icon specified to have been selected.

2. The image processing apparatus according to claim 1, wherein the question is different from a calibration question that is used for calibration.

3. The image processing apparatus according to claim 2, wherein the control unit performs a setting process corresponding to the question and the selected icon and performs a calibration process in parallel with the setting process.

4. The image processing apparatus according to claim 2, wherein the control unit acquires screen size information of the display screen and allows the image generating unit to change sizes of the option buttons in accordance with the screen size information.

5. The image processing apparatus according to claim 1, further comprising:
   an acceleration sensor; and
   an angle sensor,
   wherein, in a case where a mounting position of the image processing apparatus is detected to deviate from a reference position of the display screen based at least in part on outputs of the acceleration sensor and the angle sensor, the control unit allows the image generating unit to generate the question image and displays the question image on the display screen.

6. The image processing apparatus according to claim 1, further comprising at least one imaging unit to image the display screen.

7. A method of displaying an image comprising the steps of:
   generating a question image including a question and option buttons configured by a plurality of icons that can be arbitrarily selected for the question by using an image generating unit included in an image processing apparatus;
   detecting a position of a pointer on the display screen from imaging data acquired by imaging the display screen on which an image display is controlled by an image display control unit included in the image processing apparatus by using a position detecting unit that is included in the image processing apparatus;
   specifying an icon out of the plurality of icons selected by the pointer based on the position of the pointer, which is detected by the position detecting unit by using a control unit included in the image processing apparatus; and
   calibrating the position of the pointer, which corresponds to the selected icon, detected by the position detecting unit based at least in part on the position of the icon when the question image, which is stored in a position information storing unit included in the image processing apparatus, generated by the image generating unit is displayed on the display screen.

8. An image display program that allows a computer to function as:
   an image display control means for controlling an image display on a display screen;
   an image generating means for generating a question image including a question and option buttons configured by a plurality of icons that can be arbitrarily selected for the question;
   a position detecting means for detecting a position of a pointer on the display screen from imaging data acquired by imaging the display screen;
   a position information storing means for storing positions of the plurality of icons when the question image generated by the image generating means is displayed on the display screen; and
   a control means for specifying an icon out of the plurality of icons selected by the pointer based at least in part on the position of the pointer detected by the position detecting means and calibrating the position of the pointer that is detected by the position detecting means based at least in part on the position of the icon, which is stored in the position information storing means, corresponding to the selected icon.

9. A recording medium on which the image display program according to claim 8 is recorded.

* * * * *